US012656612B2

(12) United States Patent
Signoretto et al.

(10) Patent No.: US 12,656,612 B2
(45) Date of Patent: Jun. 16, 2026

(54) DISPLAY DEVICE AND HEAD MOUNTED DISPLAY

(71) Applicant: Sharp Display Technology Corporation, Kameyama City (JP)

(72) Inventors: Mattia Signoretto, Oxford (GB); David James Montgomery, Oxford (GB); Peter John Roberts, Oxford (GB); Naru Usukura, Kameyama City (JP); Manabu Daio, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 240 days.

(21) Appl. No.: 18/236,328

(22) Filed: Aug. 21, 2023

(65) Prior Publication Data

US 2024/0085700 A1    Mar. 14, 2024

Related U.S. Application Data

(60) Provisional application No. 63/404,910, filed on Sep. 8, 2022.

(51) Int. Cl.
| | |
|---|---|
| *G02B 27/01* | (2006.01) |
| *G02F 1/1335* | (2006.01) |
| *G02F 1/13363* | (2006.01) |

(52) U.S. Cl.
CPC ... *G02B 27/0172* (2013.01); *G02F 1/133526* (2013.01); *G02F 1/133541* (2021.01); *G02F 1/133557* (2021.01); *G02F 1/133638* (2021.01)

(58) Field of Classification Search
CPC .................................................. G02B 27/0172
See application file for complete search history.

(56) References Cited

U.S. PATENT DOCUMENTS

2020/0341268 A1* 10/2020 Amirsolaimani .... G02B 5/3083

FOREIGN PATENT DOCUMENTS

| NO | 2020/226867 A1 | 11/2020 |
|---|---|---|
| WO | 2020/112965 A1 | 6/2020 |
| WO | 2022174405 A1 | 8/2022 |

* cited by examiner

*Primary Examiner* — Edmond C Lau
(74) *Attorney, Agent, or Firm* — ScienBiziP, P.C.

(57) ABSTRACT

The display device of the present invention includes, in the following order toward a viewer: a display panel; a semi-transparent mirror; a Pancharatnam-Berry lens configured to cause one-handed circularly polarized light incident thereon that is left-handed circularly polarized light or right-handed circularly polarized light to converge while causing opposite-handed circularly polarized light incident thereon to diverge; and a circularly polarized light-selective reflector.

10 Claims, 13 Drawing Sheets

Divergence of light

Convergence of light

| ← → | Divergence of light |
| → → | Convergence of light |

| ← → | Divergence of light |
| → → | Convergence of light |

DISPLAY DEVICE AND HEAD MOUNTED DISPLAY

CROSS-REFERENCE TO RELATED APPLICATIONS

The present application claims priority under 35 U.S.C. § 119 to U.S. Provisional Patent Application No. 63/404,910 filed on Sep. 8, 2022, the contents of which are incorporated herein by reference in their entirety.

BACKGROUND OF THE INVENTION

Field of the Invention

The present disclosure relates to display devices and head-mounted displays including the display devices.

Description of Related Art

A head-mounted display (HMD) is a display device that outputs images such that a viewer (user) can see the images while wearing the HMD on the head. HMDs include, for example, immersive HMDs designed to cover both eyes to provide images displayed on the HMD to the viewer's field of view. Immersive HMDs create a deep sense of immersion by blocking out external light and are also called virtual reality (VR) devices.

Recent years have seen a growing attention to a virtual space called metaverse. VR-HMDs are a tool to access the virtual world, and thus their market is expected to grow. VR-HMDs, however, have an issue that the housing of the HMD is large, and are desired to be compact for popularization of VR-HMDs.

Techniques developed to achieve such a compact size include folded optics that utilizes the features of polarization (WO 2020/226867 and WO 2020/112965). WO 2020/226867 and WO 2020/112965 each disclose a technique of moving virtual images back and forth in the folded optics. Specifically, WO 2020/226867 and WO 2020/112965 show cases where varifocal lenses having an adjustable optical power are disposed at various positions in the optical system.

BRIEF SUMMARY OF THE INVENTION

FIG. 26 is a schematic cross-sectional view of a display device using folded optics which makes an HMD compact. FIG. 26 is a schematic exploded cross-sectional view of a display device of a comparative embodiment. As shown in FIG. 26, a display device 100R of the comparative embodiment includes, in the following order toward a viewer U, a display panel 10, a circular polarizer 20, a semi-transparent mirror 30, a lens 40R, and a circularly polarized light-selective reflector 50.

The semi-transparent mirror 30 has a function of reflecting 50% of light incident thereon while transmitting the remaining 50%. The circular polarizer 20 includes a first linearly polarizing plate 21 and a first quarter-wave plate 22. Examples of the circularly polarized light-selective reflector 50 include those having a structure including a second quarter-wave plate and a reflective linearly polarizing plate (e.g., reflective polarizer (product name: APF) available from 3M Company) and those having a structure including a cholesteric liquid crystal film.

When the display panel 10 is a liquid crystal panel, a second linearly polarizing plate facing the circular polarizer 20 across the display panel 10 may be disposed. In the display device 100R of the comparative embodiment, the functional layers and lenses may be bonded to one another or may be arranged with an air layer in between. The number of lenses may not be one and may be two or more.

The circularly polarized light-selective reflector 50 including a second quarter-wave plate and an APF emits linearly polarized light 1L. The circularly polarized light-selective reflector 50 including a cholesteric liquid crystal film emits circularly polarized light 2L.

The display device 100R using the folded optics of the comparative embodiment minimally has a structure using circularly polarized light as video light and including the semi-transparent mirror 30, the lens 40R, and the circularly polarized light-selective reflector 50 (e.g., cholesteric liquid crystal film). As current mainstream displays for HMDs are liquid crystal display devices, the display device 100R includes the first quarter-wave plate 22 on the first linearly polarizing plate 21 disposed on the liquid crystal panel, which serves as the display panel 10, so as to emit circularly polarized light.

The display device 100R using folded optics desirably includes one lens 40R in terms of cost and ease of assembly. With one lens 40R, however, the distance between the semi-transparent mirror 30 and the circularly polarized light-selective reflector 50 may not be long enough, which tends to restrict the lens design. Also from the viewpoints including diopter correction which adjusts the optical power by vertically moving one lens, it is becoming common to use two to three lenses for an HMD, which may increase the thickness of the HMD.

The display device 100R using folded optics is configured to fold the optical path to cause light to, for example, pass through the same lens a plurality of times (three times in FIG. 26). This means that the same lens surface (the same region of a lens surface) is shared by a plurality of lights whose optical paths are folded different numbers of times. This tends to restrict the lens design to further complicate the optimization of the optical system, thus possibly making it difficult to achieve sufficient display characteristics.

In response to the above issues, an object of the present invention is to provide a display device that has a thin profile and can exhibit enhanced display characteristics, and a head-mounted display including the display device.

(1) One embodiment of the present invention is directed to a display device including, in the following order toward a viewer: a display panel; a semi-transparent mirror; a Pancharatnam-Berry lens configured to cause one-handed circularly polarized light incident thereon that is left-handed circularly polarized light or right-handed circularly polarized light to converge while causing opposite-handed circularly polarized light incident thereon to diverge; and a circularly polarized light-selective reflector.

(2) In an embodiment of the present invention, the display device includes the structure (1), and light from the display panel diverges twice and converge once through the Pancharatnam-Berry lens before being emitted toward the viewer.

(3) In an embodiment of the present invention, the display device includes the structure (1) or (2), the Pancharatnam-Berry lens includes a supporting substrate and liquid crystal molecules on the supporting substrate, in a plan view of the Pancharatnam-Berry lens as viewed by the viewer, a long axis (a long axis direction) of the liquid crystal molecules rotates counterclockwise from a center to an outside of the Pancharatnam-Berry lens, and right-handed circularly polarized light from the display panel is incident on the Pancharatnam-Berry lens.

(4) In an embodiment of the present invention, the display device includes the structure (1) or (2), the Pancharatnam-Berry lens includes a supporting substrate and liquid crystal molecules on the supporting substrate, in a plan view of the Pancharatnam-Berry lens as viewed by the viewer, a long axis (a long axis direction) of the liquid crystal molecules rotates clockwise from a center to an outside of the Pancharatnam-Berry lens, and left-handed circularly polarized light from the display panel is incident on the Pancharatnam-Berry lens.

(5) In an embodiment of the present invention, the display device includes the structure (1), (2), (3), or (4), and further includes a lens between the semi-transparent mirror and the Pancharatnam-Berry lens.

(6) In an embodiment of the present invention, the display device includes the structure (5), the lens is a first lens, and the display device further includes a second lens disposed closer to the viewer than the display panel is.

(7) In an embodiment of the present invention, the display device includes the structure (6), and the second lens is disposed between the Pancharatnam-Berry lens and the circularly polarized light-selective reflector.

(8) In an embodiment of the present invention, the display device includes the structure (6), and the second lens is disposed closer to the viewer than the circularly polarized light-selective reflector is.

(9) In an embodiment of the present invention, the display device includes the structure (1), (2), (3), (4), (5), (6), (7), or (8), the Pancharatnam-Berry lens is a first Pancharatnam-Berry lens, and the display device further includes, between the semi-transparent mirror and the circularly polarized light-selective reflector, a second Pancharatnam-Berry lens configured to cause one-handed circularly polarized light incident thereon that is left-handed circularly polarized light or right-handed circularly polarized light to converge while causing opposite-handed circularly polarized light incident thereon to diverge.

(10) In an embodiment of the present invention, the display device includes the structure (9), and further includes, between the semi-transparent mirror and the circularly polarized light-selective reflector, a third Pancharatnam-Berry lens configured to cause one-handed circularly polarized light incident thereon that is left-handed circularly polarized light or right-handed circularly polarized light to converge while causing opposite-handed circularly polarized light incident thereon to diverge.

(11) Another embodiment of the present invention is directed to a head-mounted display including: the display device including any one of the structures (1), (2), (3), (4), (5), (6), (7), (8), (9), and (10), and a wearable part to be worn on a head of the viewer.

The present invention can provide a display device that has a thin profile and can exhibit enhanced display characteristics, and a head-mounted display including the display device.

DETAILED DESCRIPTION OF THE INVENTION

Hereinafter, the present invention is described in detail based on embodiments with reference to the drawings. The present invention is not limited to these embodiments.

Embodiment 1

Figure 1:
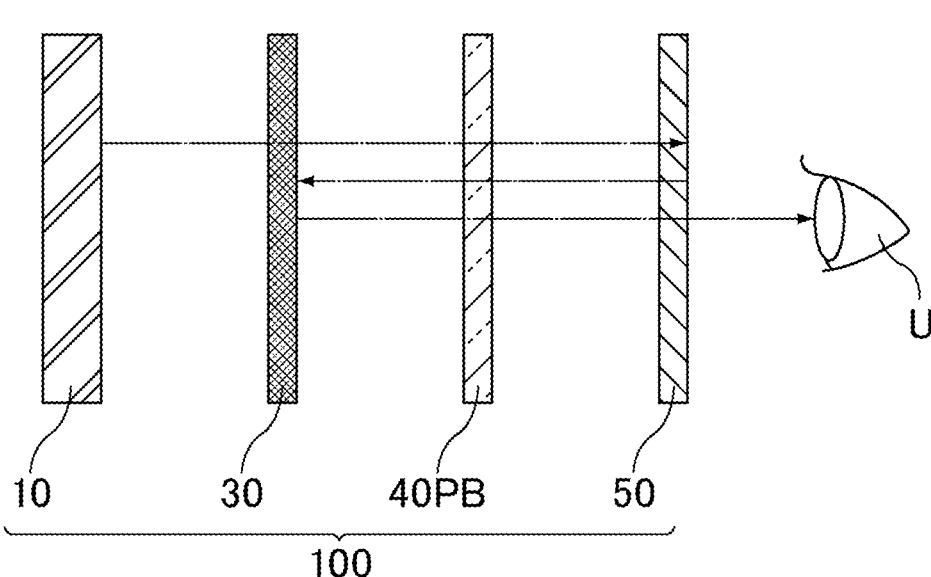
FIG. 1 is an exploded cross-sectional view schematically showing a display device of Embodiment 1.

FIG. 1 is an exploded cross-sectional view schematically showing a display device of Embodiment 1. A display device 100 of the present embodiment includes, in the following order toward a viewer U: a display panel 10; a semi-transparent mirror 30; a Pancharatnam-Berry lens 40PB configured to cause one-handed circularly polarized light incident thereon that is left-handed circularly polarized light or right-handed circularly polarized light to converge while causing opposite-handed circularly polarized light incident thereon to diverge; and a circularly polarized light-selective reflector 50.

This configuration enables folded optics using the semi-transparent mirror 30, thus making the display device 100 thin. A display device using folded optics causes lights with different optical paths to pass through the same lens surface (same region of a lens surface), which may restrict the design. Yet, with the Pancharatnam-Berry lens 40PB disposed between the semi-transparent mirror 30 and the circularly polarized light-selective reflector 50 as in the present embodiment, the design flexibility of a concave lens and/or a convex lens to be disposed in the optical paths increases owing to the convergence and divergence effects of the Pancharatnam-Berry lens 40PB. In other words, with the same lens surface (the same region of a lens surface) used, the functions of a concave lens and a convex lens are switchable according to the paths. This allows a more suitable design, thus enhancing the display characteristics (especially the image quality). The display device 100 of the present embodiment can more favorably optimize the image quality and provide a wide field of view (FOV) in folded optics. The display device 100 of the present embodiment is described in detail below.

Figure 2:
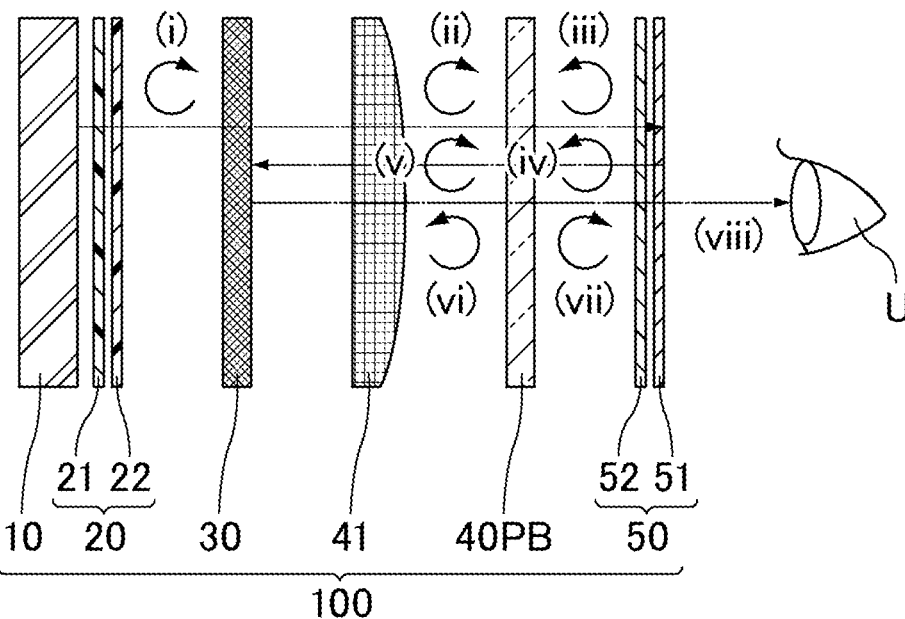
FIG. 2 is an exploded cross-sectional view schematically showing an example of the display device of Embodiment 1.

FIG. 2 is an exploded cross-sectional view schematically showing an example of the display device of Embodiment 1. As shown in FIG. 1 and FIG. 2, the display device 100 of the present embodiment includes, in the following order toward a viewer U, a display panel 10, a circular polarizer 20, a semi-transparent mirror 30, a lens 41, a Pancharatnam-Berry lens 40PB, and a circularly polarized light-selective reflector 50. The Pancharatnam Berry lens is also hereinbelow referred to as the PB lens 40PB.

FIG. 2 shows an example in which the circular polarizer 20 includes a stack of the first linearly polarizing plate 21 and the first quarter-wave plate 22 and the circularly polarized light-selective reflector 50 includes a stack of a reflective linearly polarizing plate 51 and a second quarter-wave plate 52. Although the exploded cross-sectional view herein shows the components with spaces in between, the components may be bonded to one another or may be spaced from one another. In other words, the functional layers and lenses may be bonded to one another or may be arranged with an air layer in between. The number of lenses may not be one and may be two or more.

As shown in FIG. 2, the display panel 10 emits light (display light) toward the viewer U and the first linearly polarizing plate 21 converts the display light from the display panel 10 to linearly polarized light. The linearly polarized light having passed through the first quarter-wave plate 22 is converted to circularly polarized light ((i) in FIG. 2). When the circularly polarized light is circularly polarized light rotating clockwise, the circularly polarized light rotating clockwise passes through the semi-transparent mirror 30, and then through the lens 41 with no change in rotation direction ((ii) in FIG. 2). The circularly polarized light rotating clockwise emitted from the lens 41 then passes through the PB lens 40PB to be converted to circularly polarized light rotating in reverse, i.e., counterclockwise ((iii) in FIG. 2).

The circularly polarized light rotating counterclockwise emitted from the PB lens 40PB is selectively reflected by the circularly polarized light-selective reflector 50 ((iv) in FIG. 2). The reflected circularly polarized light rotating counterclockwise then again passes through the PB lens 40PB to be converted to circularly polarized light rotating in reverse, i.e., clockwise ((v) in FIG. 2). The circularly polarized light rotating clockwise emitted from the PB lens 40PB passes through the lens 41 with no change in rotation direction, and is then reflected by the semi-transparent mirror 30 to be converted to circularly polarized light rotating counterclockwise.

The circularly polarized light rotating counterclockwise emitted from the semi-transparent mirror 30 passes through the lens 41 with no change in rotation direction ((vi) in FIG. 2). The circularly polarized light rotating counterclockwise emitted from the lens 41 passes through the PB lens 40PB to be converted to reverse-rotating circularly polarized light rotating clockwise ((vii) in FIG. 2). The circularly polarized light rotating clockwise emitted from the PB lens 40PB passes through the circularly polarized light-selective reflector 50 and is emitted toward the viewer U ((viii) in FIG. 2).

The display device 100 of the present embodiment is based on the folded optics that causes light to be reflected between the semi-transparent mirror 30 and the circularly polarized light-selective reflector 50, so that the path of light (display light) emitted from the display panel 10 toward the viewer U is folded before reaching the viewer U. This enables a long optical path while reducing the thickness of the display device 100.

Figure 3:
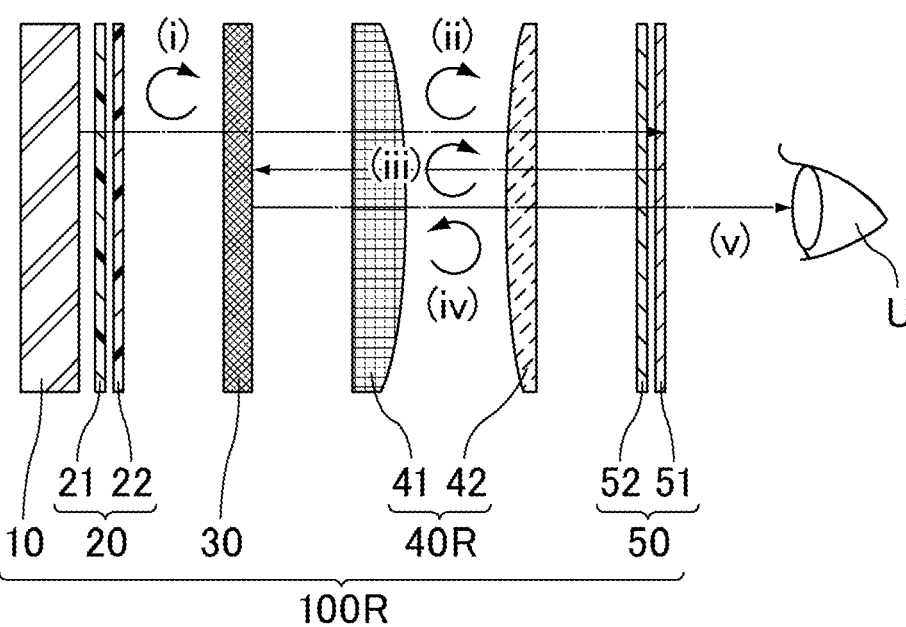
FIG. 3 is an exploded cross-sectional view schematically showing an example of a display device of a comparative embodiment.

FIG. 3 is an exploded cross-sectional view schematically showing an example of a display device of a comparative embodiment. A display device 100R of the comparative embodiment shown in FIG. 3 includes, in the following order toward a viewer U, a display panel 10, a circular polarizer 20, a semi-transparent mirror 30, a first lens 41, a second lens 42, and a circularly polarized light-selective reflector 50. The circular polarizer 20 includes a first linearly polarizing plate 21 and a first quarter-wave plate 22. The circularly polarized light-selective reflector 50 includes a reflective linearly polarizing plate 51 and a second quarter-wave plate 52. The folded optics defined by the semi-transparent mirror 30 and the circularly polarized light-selective reflector 50 causes light to pass three times the two lenses, namely the first lens 41 and the second lens 42. These two lenses in combination enlarge the video.

In the display device 100R of the comparative embodiment, as shown in FIG. 3, the display panel 10 emits light (display light) toward the viewer U, and the first linearly polarizing plate 21 converts the display light from the display panel 10 to linearly polarized light. The linearly polarized light having passed through the first quarter-wave plate 22 is converted to circularly polarized light ((i) in FIG. 3). When the circularly polarized light is circularly polarized light rotating clockwise, the circularly polarized light rotating clockwise passes through the semi-transparent mirror 30, and then through the first lens 41 with no change in rotation direction ((ii) in FIG. 3).

The circularly polarized light rotating clockwise emitted from the first lens 41 passes through the second lens 42 with no change in rotation direction, and is then selectively reflected by the circularly polarized light-selective reflector 50 with no change in rotation direction. The reflected circularly polarized light rotating clockwise passes through the second lens 42 with no change in rotation direction ((iii) in FIG. 3). The circularly polarized light rotating clockwise emitted from the second lens 42 passes through the first lens 41 with no change in rotation direction, and is then reflected by the semi-transparent mirror 30 to be converted to circularly polarized light rotating counterclockwise.

The circularly polarized light rotating counterclockwise emitted from the semi-transparent mirror 30 passes through the first lens 41 with no change in rotation direction ((iv) in FIG. 3). The circularly polarized light rotating counterclockwise emitted from the first lens 41 passes through the second lens 42 with no change in rotation direction. The circularly polarized light rotating counterclockwise emitted from the second lens 42 passes through the circularly polarized light-selective reflector 50 to be emitted toward the viewer U ((v) in FIG. 3).

As shown in FIG. 3, the second lens 42 in the display device 100R of the comparative embodiment is a common eyepiece. Thus, light incident on the second lens 42 passes therethrough as is. The display device 100R of the comparative embodiment using folded optics causes lights with different optical paths to pass through the same surface (the same region of a surface) of the second lens 42. This tends to restrict the lens design to further complicate the optimization of the optical system, thus possibly making it difficult to achieve sufficient display characteristics.

In contrast, the display device 100 of the present embodiment uses the PB lens 40PB instead of the second lens 42, which is an eyepiece. Thus, owing to the convergence and divergence effects of the PB lens 40PB, a wide range of choices for concave lenses and convex lenses suitable for different optical paths is available. As a result, a more appropriate design can be employed, so that the display characteristics can be enhanced.

(Display Panel)

The display panel 10 preferably includes pixels. The pixels are display units for displaying images and includes, in the case of color display, red, blue, and green pixels.

The display panel 10 may include a TFT substrate in which thin film transistors (TFTs) are arranged. The TFT substrate may include, on a supporting substrate, gate lines extending parallel to one another and source lines extending parallel to one another in a direction in which they intersect the gate lines via a gate insulator. The gate lines and the source lines may be formed in a grid pattern in a plan view. The regions defined by the gate lines and the source lines correspond to pixels.

The supporting substrate is preferably a transparent substrate and may be, for example, a glass substrate or a plastic substrate.

TFTs serving as switching elements may be arranged for the respective pixels at or near the respective intersections of the gate lines and the source lines. The gate terminal of each TFT may be connected to the corresponding gate line, the source terminal of the TFT may be connected to the corresponding source line, and the drain terminal of the TFT may be connected to the corresponding pixel electrode. The display panel 10 may include a common electrode to which a common electrode voltage is applied, in addition to the pixel electrodes.

The display panel 10 may be an organic light emitting diode (OLED) panel including OLEDs or a quantum dot light emitting diode (QD-LED) panel including QD-LEDs. The OLEDs and QD-LEDs herein are also referred to simply as light emitting diodes (LEDs) when no distinction is made between them.

The configuration of each light emitting diode is not limited, and may be, for example, a stack including in the following order a cathode, an electron transport layer, a light-emitting layer, a hole transport layer, and an anode.

The materials of the cathode and the anode are not limited, and may each be, for example, a transparent conductive material such as indium tin oxide (ITO), indium zinc oxide (IZO), $In_3O_3$, $SnO_2$, or ZnO, aluminum, silver, or an alloy of these.

In the case of a top-emitting LED, the pixel electrodes in the TFT substrate may be used as the anode while the common electrode may be used as the cathode. Reflective electrode(s) formed from aluminum, silver, or an alloy of these may be used as the anode while any of the above transparent conductive materials may be used as the cathode.

The hole transport layer transports holes injected from the anode to the light-emitting layer. The material of the hole transport layer is not limited and may be, for example, an amine-based compound such as N,N,N',N'-tetraphenylbenzidine or a derivative thereof.

The electron transport layer transports electrons injected from the cathode to the light-emitting layer. The material of the electron transport layer is not limited and may be, for example, a phenanthroline derivative such as 2,9-dimethyl-4,7-diphenyl-1,10-phenanthroline (BCP), a quinoline derivative such as tris(8-quinolinolato)aluminum ($Alq_3$), an azaindolizine derivative, an oxadiazole derivative, a perylene derivative, a pyridine derivative, a pyrimidine derivative, a quinoxaline derivative, a diphenylquinone derivative, or a nitro-substituted fluorene derivative.

An electron injection layer may be disposed between the cathode and the electron transport layer. A hole injection layer may be disposed between the anode and the hole transport layer. The material of the electron injection layer can be an inorganic insulating material. Examples thereof include oxides of an alkali metal, halides of an alkali metal, oxides of an alkaline earth metal, and halides of an alkaline earth metal.

When the display panel 10 is an OLED panel, the light-emitting layer may include as a luminous material a fluorescent material or a phosphorescent material, for example.

A red fluorescent material may be any material that emits red fluorescence, and may be, for example, a tetraaryl diindenoperylene derivative or another perylene derivative, a europium complex, a benzopyran derivative, a rhodamine derivative, a benzothioxanthene derivative, or a porphyrin derivative.

A green fluorescent material may be any material that emits green fluorescence, and may be, for example, a coumarin derivative, a quinacridone derivative, or an anthracene derivative.

A blue fluorescent material may be any material that emits blue fluorescence, and may be, for example, a distyrylamine derivative, a fluoranthene derivative, a pyrene derivative, perylene, a perylene derivative, an anthracene derivative, a benzoxazole derivative, a benzothiazole derivative, a benzimidazole derivative, a chrysene derivative, a phenanthrene derivative, a distyrylbenzene derivative, or tetraphenyl butadiene.

A phosphorescent material may be any material that emits phosphorescence, and may be, for example, a metal complex such as a complex of iridium, ruthenium, platinum, osmium, rhenium, or palladium. The metal complex preferably has at least one ligand having a phenylpyridine skeleton, a bipyridyl skeleton, or a porphyrin skeleton, for example.

Examples of the red phosphorescent material include tris(1-phenylisoquinoline)iridium, bis[2-(2'-benzo[4,5-α] thienyl)pyridinato-N,C3']iridium(acetylacetonate) ($btp_2Ir$ (acac)), platinum(II) 2,3,7,8,12,13,17,18-octaethyl-12H, 23H-porphyrin, bis[2-(2'-benzo[4,5-α]thienyl)pyridinato-N, C3']iridium, and bis(2-phenylpyridine)iridium (acetylacetonate).

Examples of the green phosphorescent material include fac-tris(2-phenylpyridine)iridium (Ir(ppy)₃), bis(2-phenylpyridinato-N,C2')iridium(acetylacetonate), and fac-tris [5-fluoro-2-(5-trifluoromethyl-2-pyridine)phenyl-C,N] iridium.

Examples of the blue phosphorescent material include bis[4,6-difluorophenylpyridinato-N,C2']-picolinato-iridium, tris[2-(2,4-difluorophenyl)pyridinato-N,C2']iridium, bis[2-(3,5-trifluoromethyl)pyridinato-N,C2']-picolinato-iridium, and bis(4,6-difluorophenylpyridinato-N,C2')iridium(acety-lacetonate).

The fluorescent material and the phosphorescent material are also called dopants. The light-emitting layer may contain a host material that transports electric charges to dopants. Examples of the host material include acene derivatives (acene-based compounds) such as anthracene derivatives and tetracene derivatives, distyryl arylene derivatives, perylene derivatives, distyryl benzene derivatives, distyryl amine derivatives, quinolinolato-based metal complexes such as tris(8-quinolinolato)aluminum complex (Alq$_3$), tri-aryl amine derivatives such as triphenylamine tetramer, oxadiazole derivatives, silole derivatives, carbazole deriva-tives such as 3-phenyl-4-(1'-naphthyl)-5-phenylcarbazole and 4,4'-N,N'-dicarbazolebiphenyl (CBP), oligothiophene derivatives, benzopyran derivatives, triazole derivatives, benzoxazole derivatives, benzothiazole derivatives, quino-line derivatives, and 4,4'-bis(2,2'-diphenylvinyl)biphenyl (DPVBi). The host material can appropriately be used in combination with the fluorescent material and/or the phos-phorescent material.

When the display panel 10 is a QD-LED panel, the light-emitting layer may include quantum dots as the lumi-nous material. The quantum dots are nano-sized (e.g., aver-age particle size of from 2 to 10 nm) semiconductor crystals that exhibit optical characteristics governed by quantum mechanics.

Examples thereof include colloidal particles each of which is composed of about 10 to 50 atoms. Examples of the quantum dots include those formed from a compound such as cadmium selenide (CdSe), cadmium telluride (CdTe), cadmium sulfide (CdS), lead sulfide (PbS), or indium phos-phide (InP), or an alloy such as CdSeS.

Examples of the quantum dots include core-type quantum dots each having a homogeneous internal composition con-sisting of monocomponent semiconductor crystals, alloy-type quantum dots each formed from an alloy of several types of semiconductors, and core/sell-type quantum dots each formed from a core-type or alloy-type quantum dot whose surface is coated with a semiconductor compound. Adjusting the particle size of the quantum dots enables adjustment of the peak emission wavelength. Also, varying the composition or internal structure of the quantum dots enables adjustment of the optical characteristics and elec-tronic characteristics.

Each pixel may be provided with a light emitting diode (OLED or QD-LED). In the case of an OLED panel or a QD-LED panel, a red pixel, a green pixel, and a blue pixel may respectively be provided with a red LED (OLED or QD-LED) including a red luminous material-containing light-emitting layer, a green LED including a green lumi-nous material-containing light-emitting layer, and a blue LED including a blue luminous material-containing light-emitting layer.

An OLED that emits white fluorescence or phosphores-cence can also be fabricated using a combination of any of the fluorescent or phosphorescent materials. In the case of an OLED panel, color filters including a red, green, or blue resin layer may be stacked on white OLEDs to define red pixels, green pixels, and blue pixels.

In the case of a QD-LED panel, a color OLED layer including a red OLED, a green OLED, or a blue OLED or a color filter may be stacked on a quantum dot layer of a single color such as white or blue to define red pixels, green pixels, and blue pixels.

The pixel arrangement is not limited, and may be the Pentile arrangement in which the number of green pixels is twice the number of red pixels and the number of blue pixels or may be the real RGB arrangement in which red pixels, green pixels, and blue pixels are arranged at a ratio of 1:1:1.

(Circular Polarizer)

The circular polarizer 20 converts display light from the display panel 10 to circularly polarized light before trans-mitting the display light. The circular polarizer 20 in the present embodiment includes the first linearly polarizing plate 21 and the first quarter-wave plate 22. The first linearly polarizing plate 21 converts the display light to linearly polarized light. The first quarter-wave plate 22 converts the linearly polarized light to circularly polarized light.

The first linearly polarizing plate 21 may be any plate that transmits linearly polarized light vibrating in a certain direction, and may be a polarizing plate common in the field of display devices. The linearly polarizing plate be an absorptive one or a reflective one.

The absorptive polarizing plate has a function of absorb-ing light vibrating in a certain direction while transmitting polarized light (linearly polarized light) vibrating in a direc-tion perpendicular to the certain direction. The absorptive polarizing plate has a transmission axis and an absorption axis orthogonal to the transmission axis. Examples of the absorptive linearly polarizing plate include one obtained by adsorbing iodine compound molecules on a polyvinyl alco-hol film, uniaxially stretching the film, and sandwiching the film between triacetyl cellulose (TAC) films.

The reflective polarizing plate has a function of reflecting light vibrating in a certain direction while transmitting polarized light (linearly polarized light) vibrating in a direc-tion perpendicular to the certain direction. The reflective polarizing plate has a transmission axis and a reflection axis orthogonal to the transmission axis. Examples of the reflec-tive linearly polarizing plate include a reflective polarizing plate (e.g., APCF available from Nitto Denko Corporation, DBEF available from 3M Company) obtained by uniaxially stretching a co-extruded film formed from two types of resins and a wire-grid polarizing plate composed of metal wire arrays. Examples of the wire-grid polarizing plate include one in which metal wires with a diameter of about from 10 μm to 100 μm are arranged at a pitch of from 20 μm to 200 μm.

The first quarter-wave plate 22 may be any phase differ-ence plate that introduces a phase difference of a quarter of a wavelength to incident light. The first quarter-wave plate 22 is a phase difference plate that introduces an in-plane phase difference of a quarter of a wavelength (precisely, 137.5 nm) to light with a wavelength of 550 nm, for example. The in-plane phase difference to be introduced is 120 nm or more and 150 nm or less.

The circular polarizer 20 may be a cholesteric liquid crystal element. When the circular polarizer 20 is a choles-teric liquid crystal element, the cholesteric liquid crystal element converts display light emitted from the display panel 10 to circularly polarized light.

When light is viewed from the direction opposing the light propagation direction, light waves whose vibration direction of the electric displacement vector rotates clock-wise as the light waves propagate are called circularly polarized light rotating clockwise, and those whose vibration direction of the electric displacement vector rotates counterclockwise as the light waves propagate are called circularly polarized light rotating counterclockwise. The "circularly polarized light" encompasses not only perfectly circularly polarized light (ellipticity (short axis/long axis) =1.00) but also elliptically polarized light having an ellipticity of 0.90 or more and less than 1.00.

Examples of the cholesteric liquid crystal element include one in which a cholesteric liquid crystal layer including cholesteric liquid crystals is sandwiched between paired substrates. Subjecting the substrates to alignment treatment to control the alignment azimuth of the cholesteric liquid crystals enables fabrication of a cholesteric liquid crystal element that reflects circularly polarized light rotating clockwise or counterclockwise while transmitting circularly polarized light rotating in the reverse direction. The cholesteric liquid crystal layer can be fabricated to have a thickness of several micrometers, so that the distance between the display panel 10 and the semi-transparent mirror 30 can be reduced. The substrate of the display panel 10 closer to the viewer may be used as a supporting substrate and a cholesteric liquid crystal layer may be formed on the surface of the substrate of the display panel 10 closer to the viewer.

(Semi-Transparent Mirror)

The semi-transparent mirror 30 is an optical element that reflects part of incident light while transmitting the rest of the incident light. The reflectance and the transmittance of the semi-transparent mirror 30 are not limited. For example, the semi-transparent mirror 30 reflects from 30% to 70% of incident light while transmitting the rest, and preferably reflects 50% of incident light while transmitting the remaining 50%. The semi-transparent mirror 30 can be formed from, for example, a metal film or a dielectric multilayer film. Controlling the film thickness enables control of the transmittance and reflectance.

(PB Lens)

The display device 100 of the present embodiment includes the PB lens 40PB between the semi-transparent mirror 30 and the circularly polarized light-selective reflector 50. The PB lens 40PB causes one-handed circularly polarized light that is left-handed circularly polarized light or right-handed circularly polarized light incident thereon to converge while causing the opposite-handed circularly polarized light incident thereon to diverge. This configuration can enhance the display characteristics of the display device 100 using folded optics. For example, the image quality can be more favorably optimized and, in particular, a wide field of view (FOV) can be achieved in folded optics. The PB lens 40PB is also referred to as a Pancharatnam-Berry phase (PBP) lens. The PB lens 40PB is a diffractive lens.

The techniques disclosed in WO 2020/226867 and WO 2020/112965 are intended for use in moving virtual images and do not give any consideration to enhancement of image quality or other display characteristics in folded optics. Also, the display device of the present embodiment differs in configuration from the techniques in WO 2020/226867 and WO 2020/112965 which do not utilize a PB lens disposed between the lens 41 and the circularly polarized light-selective reflector 50.

Figure 4:
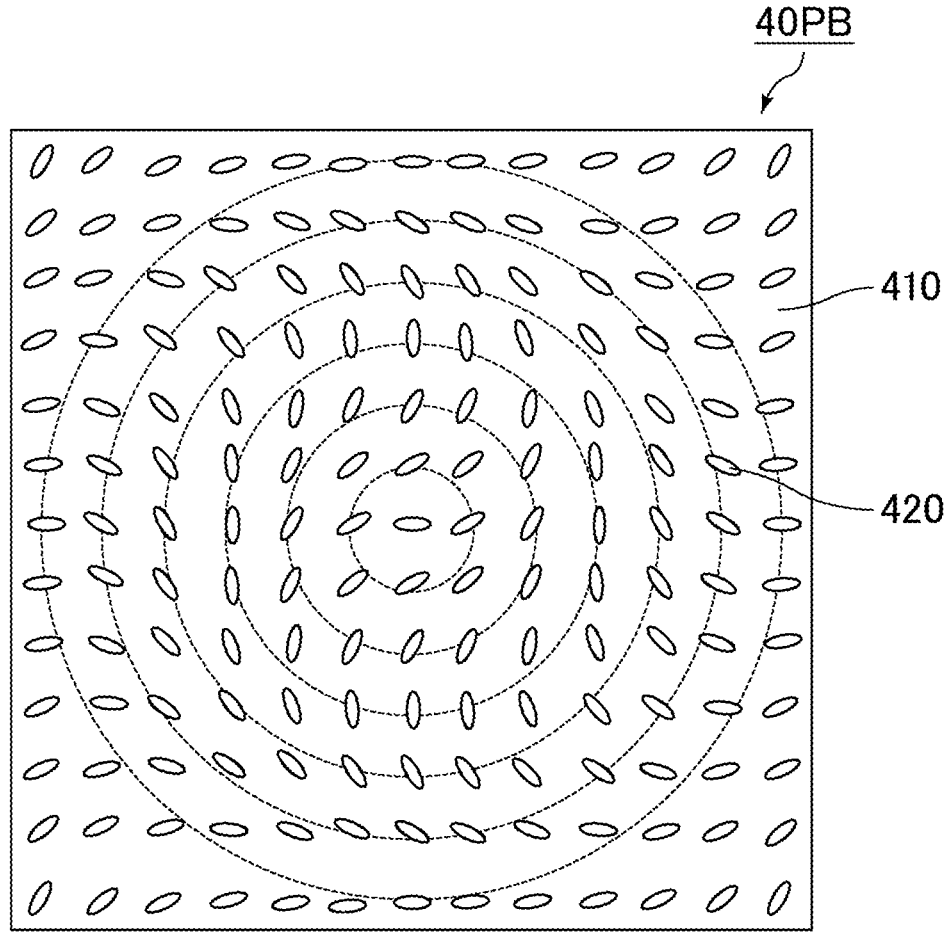
FIG. 4 is a schematic plan view of a PB lens.

FIG. 4 is a schematic plan view of a PB lens. The PB lens 40PB in the present embodiment includes, as shown in FIG. 4, a supporting substrate 410 and liquid crystal molecules 420 placed on the supporting substrate 410 and periodically aligned. The periodic alignment of the liquid crystal molecules 420 causes diffraction to achieve the lens function.

Figure 5:
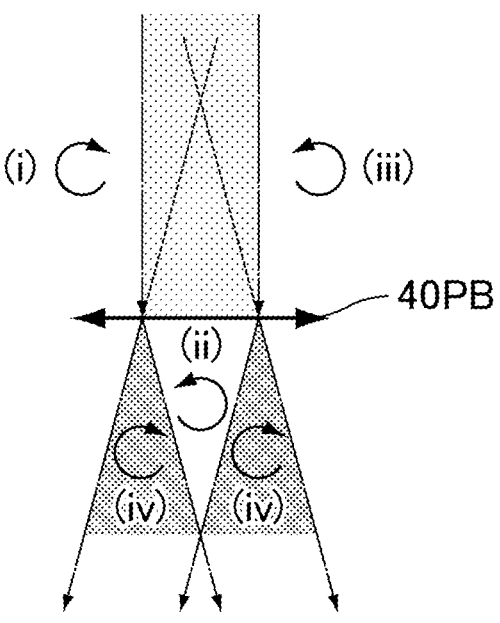
FIG. 5 is a schematic view showing an example of convergence and divergence of light through a PB lens.

FIG. 5 is a schematic view showing an example of convergence and divergence of light through a PB lens. As shown in FIG. 5, for example, when one-handed circularly polarized light that is left-handed circularly polarized light or right-handed circularly polarized light is incident on the PB lens 40PB, the PB lens 40PB causes the one-handed circularly polarized light to converge while converting the one-handed circularly polarized light to the opposite-handed circularly polarized light by rotating the one-handed circularly polarized light in reverse. When the opposite-handed circularly polarized light is incident on the PB lens 40PB, the PB lens 40PB causes the opposite-handed circularly polarized light to diverge while converting the opposite-handed circularly polarized light to the one-handed circularly polarized light by rotating the opposite-handed circularly polarized light in reverse.

Specifically, as shown in FIG. 5, right-handed circularly polarized light ((i) in FIG. 5) incident on the PB lens 40PB is rotated in reverse to be converted to left-handed circularly polarized light and converges ((ii) in FIG. 5). Left-handed circularly polarized light ((iii) in FIG. 5) incident on the PB lens 40PB is rotated in reverse to be converted to right-handed circularly polarized light and diverges ((iv) in FIG. 5). In this manner, switching the rotation direction of circularly polarized light incident on the PB lens 40PB enables switching between divergence and convergence of light at the focal point f. The rotation direction of circularly polarized light emitted from the PB lens 40PB is opposite to the rotation direction of circularly polarized light incident on the PB lens 40PB.

Figure 6:
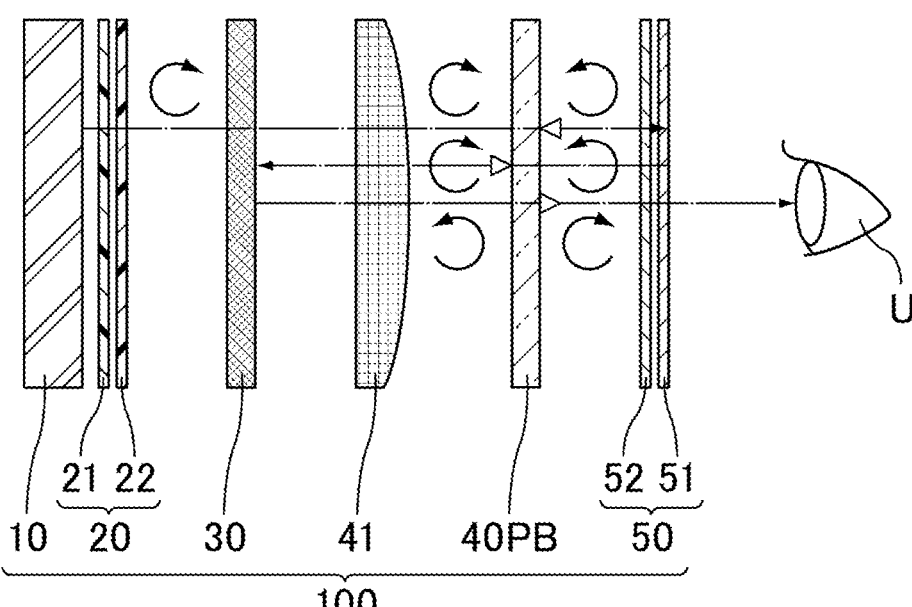
FIG. 6 is an example of an exploded cross-sectional view of the display device of Embodiment 1.
Figure 7:
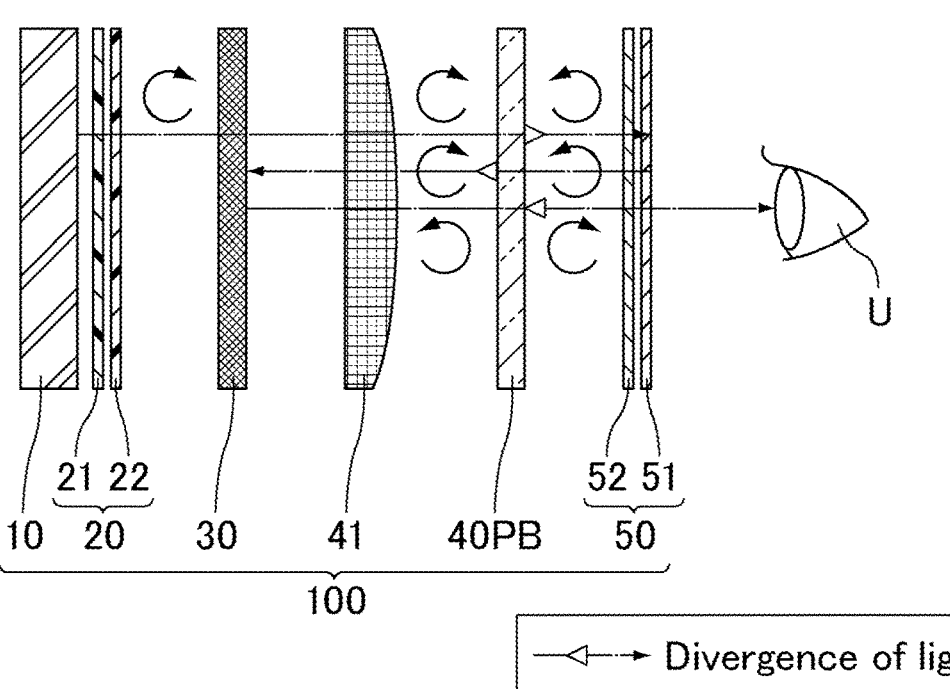
FIG. 7 is an example of an exploded cross-sectional view of the display device of Embodiment 1.

FIG. 6 and FIG. 7 are each an example of an exploded cross-sectional view of the display device of Embodiment 1. The display device 100 of the present embodiment may be of either of the two types shown in FIG. 6 and FIG. 7 which are different in direction of arrows representing divergence and convergence of light through the PB lens 40PB. FIG. 6 shows a mode where light emitted from the display panel 10 diverges twice and converges once through the PB lens 40PB before being emitted toward the viewer U. FIG. 7 shows a mode where light emitted from the display panel 10 converges twice and diverges once through the PB lens 40PB before being emitted toward the viewer U. The long axis direction of the liquid crystal molecules in the PB lens rotates differently when the front surface of the PB lens is observed and when the back surface of the PB lens is observed. For example, when the liquid crystal molecules are arranged with their long axis direction rotating counterclockwise in observation of the front surface of the PB lens, the liquid crystal molecules appear to be arranged with their long axis direction rotating clockwise in observation of the back surface of the PB lens. In other words, when right-handed circularly polarized light incident on the front surface of the PB lens diverges, right-handed circularly polarized light incident on the back surface of the PB lens converges.

Light emitted from the display panel 10 preferably diverges twice and converges once through the PB lens 40PB before being emitted toward the viewer U. This configuration enables effective enhancement of the display characteristics.

Figure 8:
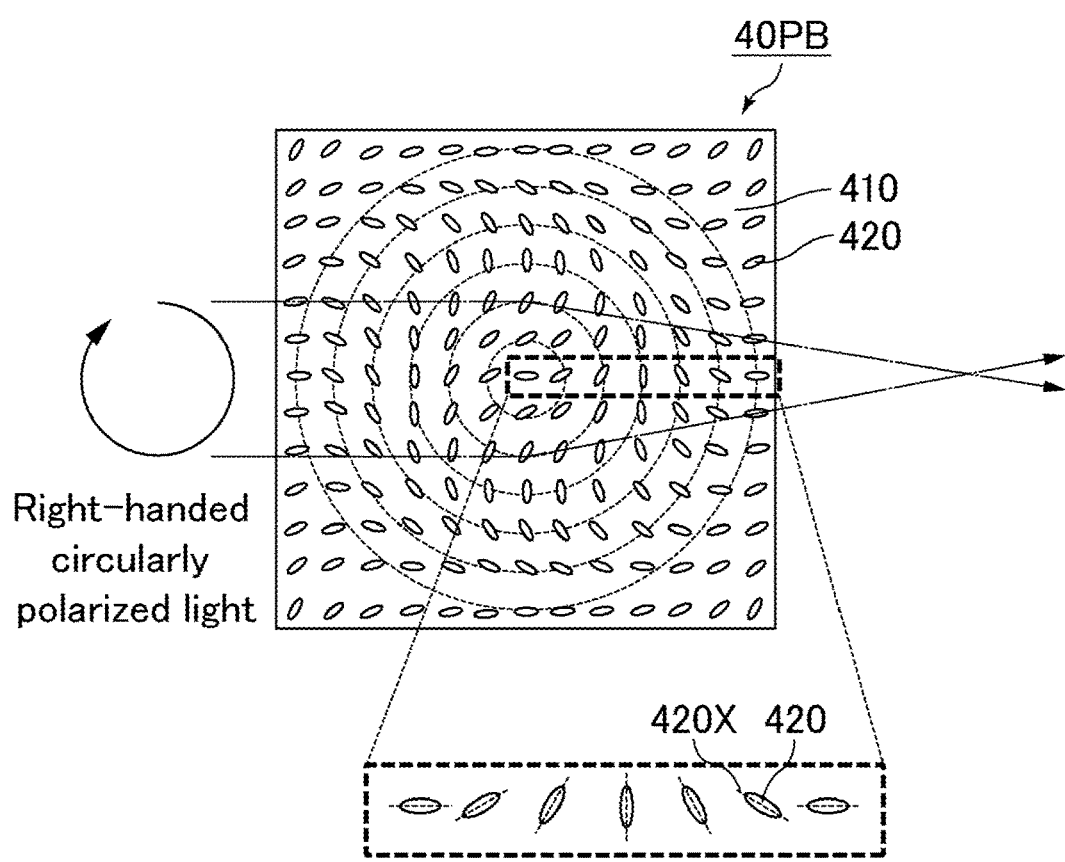
FIG. 8 is a plan view of an example of a PB lens.
Figure 9:
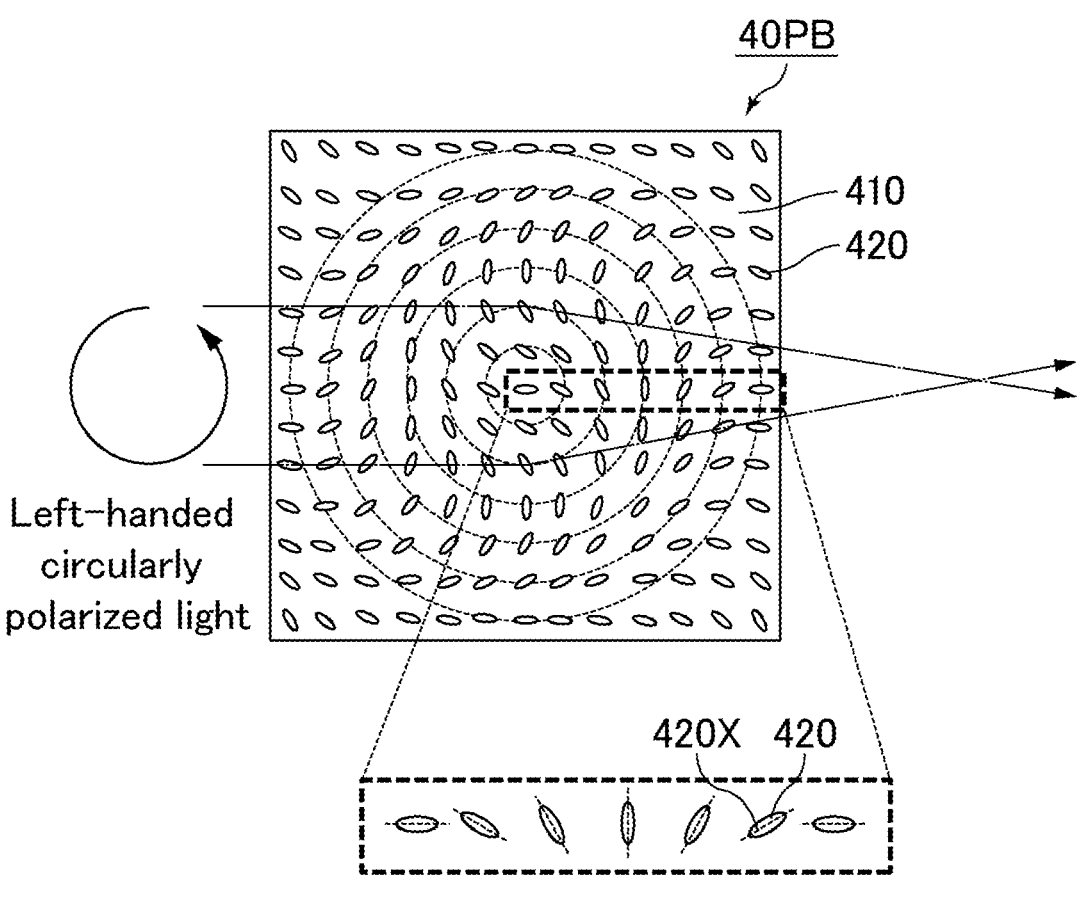
FIG. 9 is a plan view of an example of a PB lens.

FIG. 8 and FIG. 9 are each a plan view of an example of a PB lens. The plan views shown in FIG. 8 and FIG. 9 are the PB lens as viewed by the viewer U. There are two types of structures for the PB lens 40PB; one is the structure in which, as shown in FIG. 8, a long axis 420X direction of the liquid crystal molecules 420 rotates counterclockwise from the center to the outside, and the other is the structure in which, as shown in FIG. 9, the long axis 420X direction of the liquid crystal molecules 420 rotates clockwise from the center to the outside. These structures are different in effect on polarization.

As shown in FIG. 8, preferably, the PB lens 40PB has a structure in which a supporting substrate 410 and liquid crystal molecules 420 placed on the supporting substrate 410 are included and the long axis 420X direction of the liquid crystal molecules 420 rotates counterclockwise from the center to the outside of the PB lens 40PB in a plan view of the PB lens 40PB as viewed by the viewer U, and right-handed circularly polarized light from the display panel 10 is incident on the PB lens 40PB. This configuration, as shown in FIG. 6, causes light from the display panel 10 to diverge twice and converge once through the PB lens 40PB before being emitted toward the viewer U.

As shown in FIG. 9, preferably, the PB lens 40PB has a structure in which a supporting substrate 410 and liquid crystal molecules 420 placed on the supporting substrate 410 are included and the long axis 420X direction of the liquid crystal molecules 420 rotates clockwise from the center to the outside of the PB lens 40PB in a plan view of the PB lens 40PB as viewed by the viewer U, and left-handed circularly polarized light from the display panel 10 is incident on the PB lens 40PB. This configuration causes light from the display panel 10 to diverge twice and converge once through the PB lens 40PB before being emitted toward the viewer U.

As shown in FIG. 8, the PB lens 40PB may have a structure in which the supporting substrate 410 and the liquid crystal molecules 420 placed on the supporting substrate 410 are included and the long axis 420X direction of the liquid crystal molecules 420 rotates counterclockwise from the center to the outside of the PB lens 40PB in a plan view of the PB lens 40PB as viewed by the viewer U, and left-handed circularly polarized light from the display panel 10 may be incident on the PB lens 40PB. This configuration causes light from the display panel 10 to converge twice and diverge once through the PB lens 40PB before being emitted toward the viewer U.

As shown in FIG. 9, the PB lens 40PB may have a structure in which the supporting substrate 410 and the liquid crystal molecules 420 placed on the supporting substrate 410 are included and the long axis 420X direction of the liquid crystal molecules 420 rotates clockwise from the center to the outside of the PB lens 40PB in a plan view of the PB lens 40PB as viewed by the viewer U, and right-handed circularly polarized light from the display panel 10 may be incident on the PB lens 40PB. This configuration causes light from the display panel 10 to converge twice and diverge once through the PB lens 40PB before being emitted toward the viewer U.

The rotation direction of circularly polarized light to be incident on the PB lens 40PB can be controlled by switching the fast axis and the slow axis of the first quarter-wave plate 22.

The PB lens 40PB can be produced, for example, by the method disclosed in WO 2019/189818.

Figure 10:
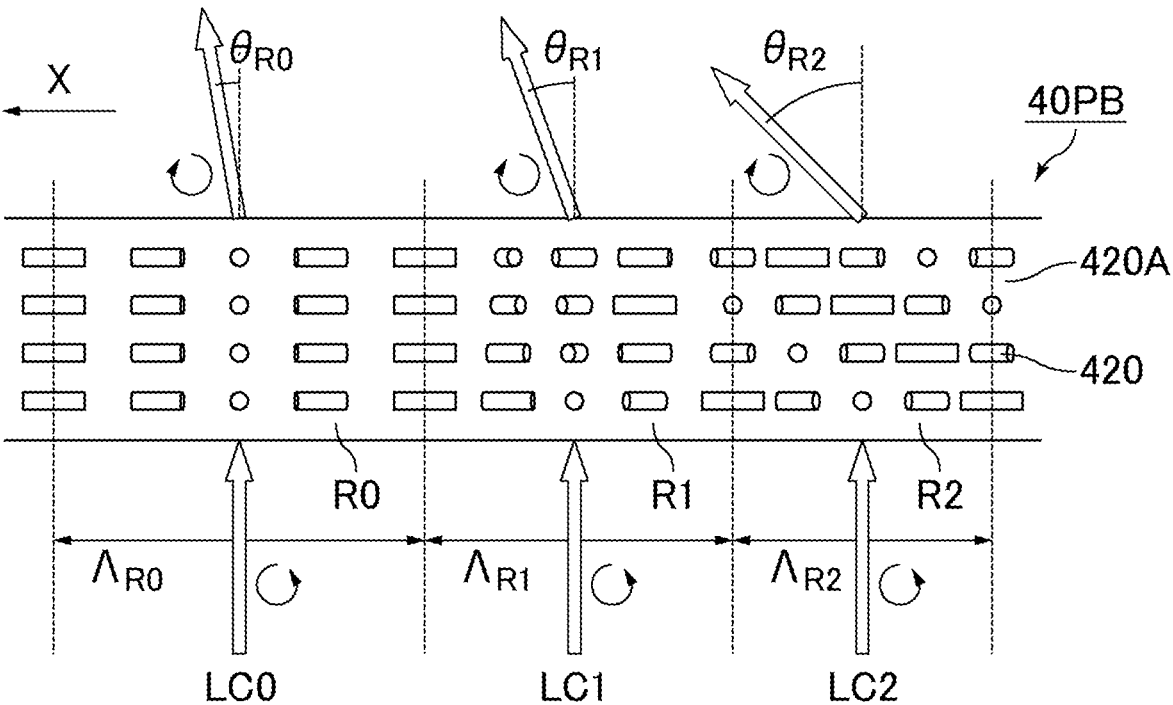
FIG. 10 is an example of a schematic cross-sectional view of a PB lens included in the display device of Embodiment 1.

FIG. 10 is an example of a schematic cross-sectional view of a PB lens included in the display device of Embodiment 1. The PB lens 40PB, as shown in FIG. 10, includes an optically anisotropic layer 420A containing the liquid crystal molecules 420. For example, the PB lens 40PB diffracts circularly polarized light incident thereon in a predetermined direction before transmitting the light. In FIG. 10, the incident light is left-handed circularly polarized light.

As shown in FIG. 10, the optically anisotropic layer 420A shown in FIG. 10 includes three regions R0, R1, and R2 from the left in FIG. 10, and the regions have different lengths A of one period. Specifically, the order of length A of one period is regions R0, R1, and R2, from longest to shortest. The regions R1 and R2 may each have a structure in which the optic axis is twist-rotated in the thickness direction of the optically anisotropic layer (hereinafter, also referred to as a twisted structure). Stacking two such twisted structures can increase the diffraction efficiency for light with wide wavelength ranges and/or light with a large angle of incidence.

In the display device 100, left-handed circularly polarized light LC1 incident on the in-plane region R1 of the optically anisotropic layer 420A is transmitted after being diffracted at a predetermined angle in the direction of the arrow X, i.e., one direction in which the orientation of the optic axis of the liquid crystal molecules 420 varies while rotating continuously, from the incident direction. Similarly, left-handed circularly polarized light LC2 incident on the in-plane region R2 of the optically anisotropic layer 420A is transmitted after being diffracted at a predetermined angle in the direction of the arrow X from the incident direction. Also, left-handed circularly polarized light LC0 incident on the in-plane region R0 of the optically anisotropic layer 420A is transmitted after being diffracted at a predetermined angle in the direction of the arrow X from the incident direction.

The one period $\Lambda_{R2}$ of the liquid crystal alignment pattern of the region R2 is shorter than the one period $\Lambda_{R1}$ of the liquid crystal alignment pattern of the region R1. Thus, in the optically anisotropic layer 420A, as shown in FIG. 10, the angle of diffraction $\theta_{R2}$ provided to light incident on and transmitted through the region R2 is larger than the angle of diffraction $\theta_{R1}$ provided to light incident on and transmitted through the region R1. Also, the one period $\Lambda_{R0}$ of the liquid crystal alignment pattern of the region R0 is longer than the one period $\Lambda_{R1}$ of the liquid crystal alignment pattern of the region R1. Thus, as shown in FIG. 10, the angle of diffraction $\theta_{R0}$ provided to light incident on and transmitted through the region R0 is smaller than the angle of diffraction $\theta_{R1}$ provided to light incident on and transmitted through the region R1.

Here, diffraction of light by the optically anisotropic layer having a liquid crystal alignment pattern in which the orientation of the optic axis of the liquid crystal molecules varies while continuously rotating in a plane involves an issue that the diffraction efficiency decreases as the angle of diffraction increases, i.e., the intensity of the diffracted light decreases. This means that when the optically anisotropic layer has a structure including regions with different lengths of one period, in which the orientation of the optic axis of the liquid crystal molecules is rotated by 180°, the angle of diffraction differs depending on the position of incidence of light, resulting in a difference in quantity of diffracted light depending on the in-plane position of incidence of light. In other words, the structure produces a region where transmitted, diffracted light weakens at certain in-plane positions of incidence of light.

Meanwhile, the PB lens 40PB of the present embodiment includes the regions where liquid crystal molecules are twist-rotated in the thickness direction in the optically anisotropic layer and the twist angle in the thickness direction differs from region to region. In the example in FIG. 10, the twist angle $\varphi_{R2}$ in the thickness direction of the region R2 is larger than the twist angle $\varphi_{R1}$ in the thickness direction of the region R1 in the optically anisotropic layer 420A. The region R0 has no twisted structure in the thickness direction. This can reduce or prevent a decrease in diffraction efficiency of diffracted light.

In the example in FIG. 10, the regions R1 and R2 larger in angle of diffraction than the region R0 each have a twisted structure. This can reduce or prevent a decrease in quantity of light diffracted by the regions R1 and R2. Also, the region R2 larger in angle of diffraction than the region R1 is also larger in twist angle of the twisted structure than the region R1. This can reduce or prevent a decrease in quantity of light diffracted by the region R2. The configuration can equalize the quantities of transmitted lights regardless of the in-plane positions of incidence of light.

As described above, in an in-plane region where the optically anisotropic layer provides a large angle of diffraction in the PB lens 40PB of the present embodiment, incident light is diffracted by passing through a layer with a large twist angle in the thickness direction. Meanwhile, in an in-plane region where the optically anisotropic layer provides a small angle of diffraction, incident light is diffracted by passing through a layer with a small twist angle in the thickness direction. In other words, the PB lens 40PB can produce transmitted light brighter than incident light by setting the in-plane twist angle in the thickness direction according to the angle of diffraction provided by the optically anisotropic layer. Thus, the PB lens 40PB can reduce the diffraction angle dependence of the quantity of transmitted light in the plane.

The angle of light diffraction in the plane of the optically anisotropic layer 420A increases as the one period A of the liquid crystal alignment pattern becomes shorter. Also, the twist angle in the thickness direction in the plane of the optically anisotropic layer 420A is larger in a region with a short one period $\Lambda$, in which the orientation of the optic axis rotates by 180° in the direction of the arrow X in the liquid crystal alignment pattern, than in a region with a long one period $\Lambda$. In the PB lens 40PB, for example, as shown in FIG. 10, the one period $\Lambda_{R2}$ of the liquid crystal alignment pattern in the region R2 of the optically anisotropic layer 420A is shorter than the one period $\Lambda_{R1}$ of the liquid crystal alignment pattern in the region R1, and the twist angle $\varphi_{R2}$ in the thickness direction is larger than the twist angle $\varphi_{R1}$. In other words, the region R2 in the optically anisotropic layer 420A on the light incident side more diffracts light.

Thus, when the in-plane twist angle $\varphi$ in the thickness direction is set for the one period $\Lambda$ of the liquid crystal alignment pattern in question, the transmitted lights diffracted at different angles in different in-plane regions can be suitably brighter.

In the PB lens 40PB, as described above, since the angle of diffraction increases as the one period $\Lambda$ of the liquid crystal alignment pattern becomes shorter, a larger twist angle in the thickness direction is set for a region with a shorter one period $\Lambda$ of the liquid crystal alignment pattern, so that the transmitted light can be brighter. Thus, in the PB lens 40PB, preferably, the regions with different lengths of one period of the liquid crystal alignment pattern include regions where the order of length of one period and the order of twist angle in the thickness direction are different.

The PB lens 40PB preferably includes the optically anisotropic layer 420A formed from a liquid crystal composition containing the liquid crystal molecules 420. The optically anisotropic layer 420A preferably includes regions each of which has a liquid crystal alignment pattern with the orientation of the optic axis of the liquid crystal molecules varying while continuously rotating in at least one in-plane direction, and in which the optic axis is preferably twist-rotated in the thickness direction of the optically anisotropic layer 420A. The twist angle in the thickness direction preferably differs from region to region.

Preferably, the PB lens 40PB includes regions with different lengths of one period in the liquid crystal alignment pattern, where the one period is the length in which the orientation of the optic axis of the liquid crystal molecules 420 is rotated by 180° in the plane.

Preferably, the optically anisotropic layer 420A includes the regions with different lengths of one period in the liquid crystal alignment pattern arranged by length of one period, and the regions with different twist angles in the thickness direction arranged by twist angle in the thickness direction, wherein the direction of the arrangement by length of one period and the direction of the arrangement by twist angle in the thickness direction are different.

Preferably, the optically anisotropic layer 420A includes regions where the twist angle in the thickness direction is from 10° to 360°.

Preferably, in the optically anisotropic layer 420A, the one period of the liquid crystal alignment pattern becomes shorter gradually in the one direction in which the orientation of the optic axis of the liquid crystal molecules 420 in the liquid crystal alignment pattern varies while continuously rotating.

Preferably, the liquid crystal alignment pattern of the optically anisotropic layer 420A is a concentric circular pattern where the one direction, in which the orientation of the optic axis of the liquid crystal molecules 420 varies while continuously rotating, lies from inside toward outside.

The PB lens 40PB in FIG. 10 is a PB lens with the twist angle varying in the plane, and is an element having a high diffraction efficiency even when the angle of diffraction is large. Yet, the PB lens 40PB may be a PB lens with the twist angle not varying in the plane. Specifically, the PB lens 40PB may be a PB lens without a twist in the thickness direction or with a constant twist angle in the plane. For example, the polarization diffraction grating disclosed in JP 2008-532085 T can be used.

Preferably, the PB lens 40PB is a PB lens including a plurality of optically anisotropic layers 420A, and the optically anisotropic layers 420A are different from one another in orientation of the twist angle in the thickness direction.

Preferably, the PB lens 40PB is a PB lens including a plurality of optically anisotropic layers 420A, and the optically anisotropic layers 420A are different from one another in twist angle in the thickness direction.

Preferably, the PB lens 40PB is a PB lens including a plurality of optically anisotropic layers 420A, and the optically anisotropic layers 420A have liquid crystal alignment patterns that are the same as one another in in-plane direction in which the orientation of the optic axis of the liquid crystal molecules 420 continuously rotates.

Preferably, the length of one period in the liquid crystal alignment pattern is 50 μm or shorter.

(Lens)

The display device 100 preferably includes the lens 41 between the semi-transparent mirror 30 and the PB lens 40PB. This configuration increases the flexibility in optimization of the optical system, thus enabling effective enhancement of the display characteristics.

The lens 41 may be any lens that enlarges/reduces images on the display panel 10. The combination of the lens 41 and the PB lens 40PB causes the viewer to perceive an enlarged image (virtual image) of the display image displayed on the display panel 10. The combination of the lens 41 and the PB lens 40PB preferably defines an aspherical lens designed to concentrate lights having passed through the combination of the lens 41 and the PB lens 40PB to the eyes of the viewer U. The first lens 41 may be a refractive lens or a diffractive lens.

The refractive lens can be one usually used in the field of HMDs. Examples thereof include refractive lenses having curved surface(s) (convex surface(s)), including plano-convex lenses, double-convex lenses, and meniscus lenses. A Fresnel lens may be used in combination. The refractive lens is preferably disposed such that the convex surface faces the display panel 10. The refractive lens may be an achromatic lens fabricated by attaching two lenses with different wavelength dispersions to each other, or may be a combination of a plurality of lenses. For example, two lenses are used in a commonly used optical system in order to achieve an appropriate optical power. Possibly, one of the two lenses closer to the display device is a double-convex lens while the other lens closer to the viewer is a plano-convex lens with its convex Fresnel lens surface facing the panel.

Examples of the diffractive lens include transparent holographic optical elements. A transparent holographic optical element used as the diffractive lens can form an image on the display panel 10 by utilizing the diffraction phenomenon of light described above. The holographic film can be one imparted with the desired optical characteristics by interference lithography using lights corresponding to the incident light and the emission light. A holographic film is also producible by a method called computer-generated holography (CGH) used to achieve the desired optical characteristics by individually illuminating small areas of an object.

(Circularly Polarized Light-Selective Reflector)

The circularly polarized light-selective reflector 50 selectively reflects circularly polarized light having passed through the PB lens 40PB. Preferably, the circularly polarized light-selective reflector 50 transmits circularly polarized light with the same rotation direction as circularly polarized light having passed through the circular polarizer 20 while reflecting circularly polarized light with the opposite rotation direction from circularly polarized light having passed through the circular polarizer 20. For example, when circularly polarized light having passed through the circular polarizer 20 rotates clockwise, the circularly polarized light-selective reflector 50 transmits circularly polarized light rotating clockwise while reflecting circularly polarized light rotating counterclockwise.

The circularly polarized light-selective reflector 50 may include a stack of the reflective linearly polarizing plate 51 and the second quarter-wave plate 52. The reflective linearly polarizing plate 51 and the second quarter-wave plate 52 can be the same ones as the reflective linearly polarizing plate and the first quarter-wave plate 22 described above as examples of the components of the circular polarizer 20. Preferably, the slow axis of the first quarter-wave plate 22 of the circular polarizer 20 and the slow axis of the second quarter-wave plate 52 of the circularly polarized light-selective reflector 50 are orthogonal to each other.

The circularly polarized light-selective reflector 50 may be a cholesteric liquid crystal element. When the circularly polarized light-selective reflector 50 is a cholesteric liquid crystal element, the same one as the cholesteric liquid crystal element described above as an example of the circular polarizer 20 can be used. Light having passed through the cholesteric liquid crystal element is circularly polarized light. When both the circular polarizer 20 and the circularly polarized light-selective reflector 50 are cholesteric liquid crystal elements, preferably, the cholesteric liquid crystal element as the circular polarizer 20 and the cholesteric liquid crystal element as the circularly polarized light-selective reflector 50 are opposite from each other in direction (clockwise, counterclockwise) of the transmitted circularly polarized light.

Modified Example 1 of Embodiment 1

Figure 11:
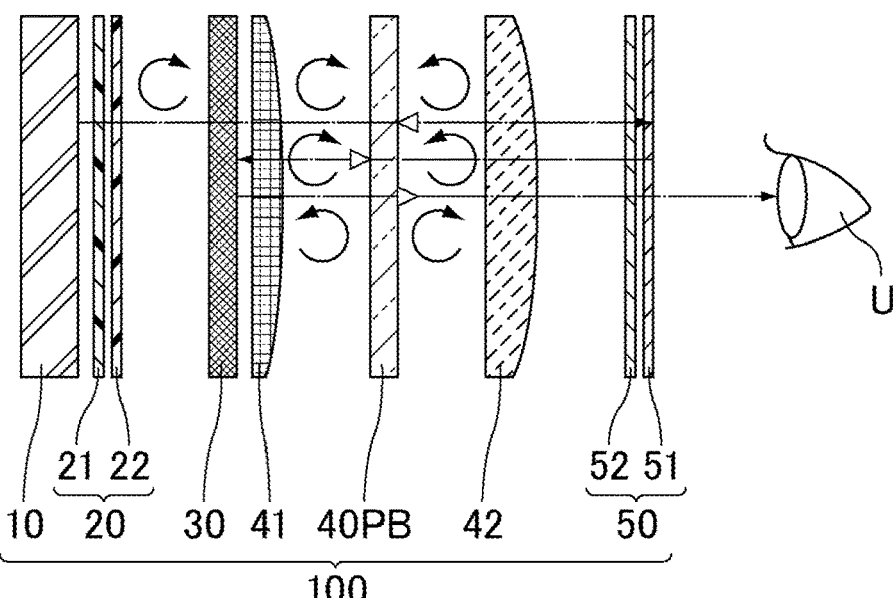
FIG. 11 is an exploded cross-sectional view of a display device of Modified Example 1 of Embodiment 1.

FIG. 11 is an exploded cross-sectional view of a display device of Modified Example 1 of Embodiment 1. As shown in FIG. 11, the lens 41 is a first lens 41, and the display device 100 of the present modified example may further include a second lens 42 closer to a viewer U than the display panel 10 is. This configuration increases the flexibility in optimization of the optical system, thus enabling effective enhancement of the display characteristics.

The first lens 41 is disposed, for example, between the semi-transparent mirror 30 and the PB lens 40PB.

The second lens 42 can be a refractive lens as with the lens (first lens) 41. This configuration can allocate the optical power of the first lens 41 to two lenses (first lens 41 and second lens 42) and allow the two lenses to have different freeform surfaces. This allows a design that can prevent or reduce aberrations including chromatic aberration.

The second lens 42 is disposed, for example, between the PB lens 40PB and the circularly polarized light-selective reflector 50.

Modified Example 2 of Embodiment 1

Figure 12:
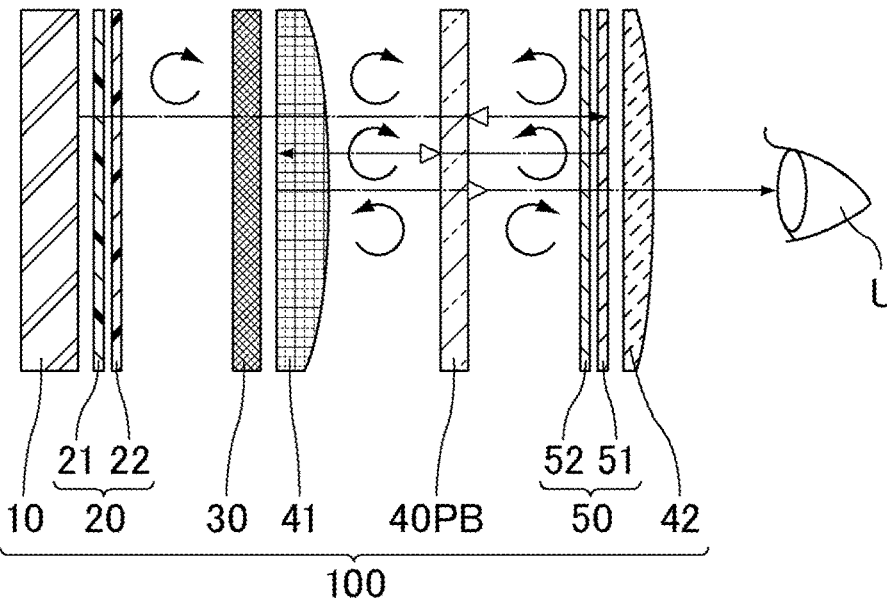
FIG. 12 is an exploded cross-sectional view of a display device of Modified Example 2 of Embodiment 1.

FIG. 12 is an exploded cross-sectional view of a display device of Modified Example 2 of Embodiment 1. As shown in FIG. 12, the second lens 42 is preferably disposed closer to the viewer U than the circularly polarized light-selective reflector 50 is. In this configuration, light emitted from the display panel 10 passes only once through the second lens 42, which is an eyepiece. This facilitates optimization of the optical system and increases the flexibility of design, thus enabling effective enhancement of the display characteristics.

Modified Example 3 of Embodiment 1

Figure 13:
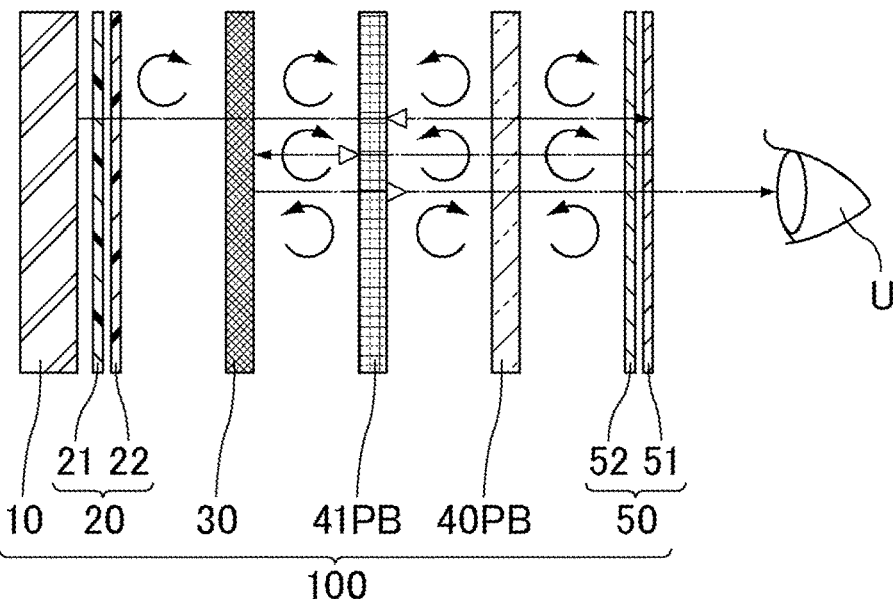
FIG. 13 is an exploded cross-sectional view of a display device of Modified Example 3 of Embodiment 1.

FIG. 13 is an exploded cross-sectional view of a display device of Modified Example 3 of Embodiment 1. As shown in FIG. 13, the PB lens 40PB is a first PB lens, and a second Pancharatnam-Berry lens (PB lens) 41PB may further be disposed between the semi-transparent mirror 30 and the circularly polarized light-selective reflector 50. The PB lens 41PB causes one-handed circularly polarized light that is left-handed circularly polarized light or right-handed circularly polarized light incident thereon to converge while causing the opposite-handed circularly polarized light incident thereon to diverge. This configuration can make the display device 100 more flat to further reduce the thickness of the display device 100. The configuration also facilitates assembly to reduce the cost.

The above configuration including the second PB lens 41PB can allocate the optical power of the first PB lens 40PB to two PB lenses (first PB lens 40PB and second PB lens 41PB), can allow the two lenses to have different freeform surfaces, and can alternate the orientation of the PB lenses. This allows a design that can prevent or reduce aberrations including chromatic aberration.

Modified Example 4 of Embodiment 1

Figure 14:
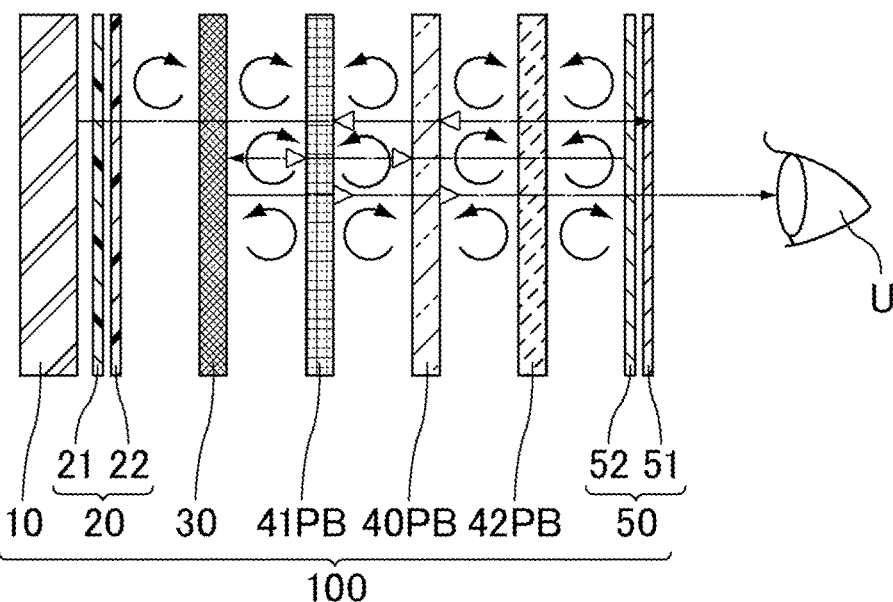
FIG. 14 is an exploded cross-sectional view of a display device of Modified Example 4 of Embodiment 1.

FIG. 14 is an exploded cross-sectional view of a display device of Modified Example 4 of Embodiment 1. As shown in FIG. 14, a third Pancharatnam-Berry lens (PB lens) 42PB may further be disposed between the semi-transparent mirror 30 and the circularly polarized light-selective reflector 50 in the configuration in the Modified Example 3 of Embodiment 1. The PB lens 42PB causes one-handed circularly polarized light that is left-handed circularly polarized light or right-handed circularly polarized light incident thereon to converge while causing the opposite-handed circularly polarized light incident thereon to diverge. This configuration can make the display device 100 more flat to further reduce the thickness of the display device 100. The configuration also facilitates assembly to reduce the cost. In addition, the configuration increases the flexibility in optimization of the optical system, thus enabling effective enhancement of the display characteristics.

The third PB lens 42PB is the same as the first PB lens 40PB.

The above configuration including the third PB lens 42PB can allocate the optical power of the first PB lens 40PB to three PB lenses (first PB lens 40PB, second PB lens 41PB, and third PB lens 42PB), can allow the three lenses to have different freeform surfaces, and can alternate the orientation of the PB lenses. This allows a design that can prevent or reduce aberrations including chromatic aberration.

Embodiment 2

In the present embodiment, features unique to the present embodiment are mainly described and description of the same features as in Embodiment 1 is omitted. A display device of the present embodiment includes a liquid crystal panel as the display panel. In Embodiment 2, the display panel is a liquid crystal panel including a pair of substrates and a liquid crystal layer sandwiched between the substrates, the circular polarizer includes a stack of a first linearly polarizing plate and a quarter-wave plate, and the display device further includes a second linearly polarizing plate facing the circular polarizer across the display panel. Description of the same configuration as in Embodiment 1 is omitted.

Figure 15:
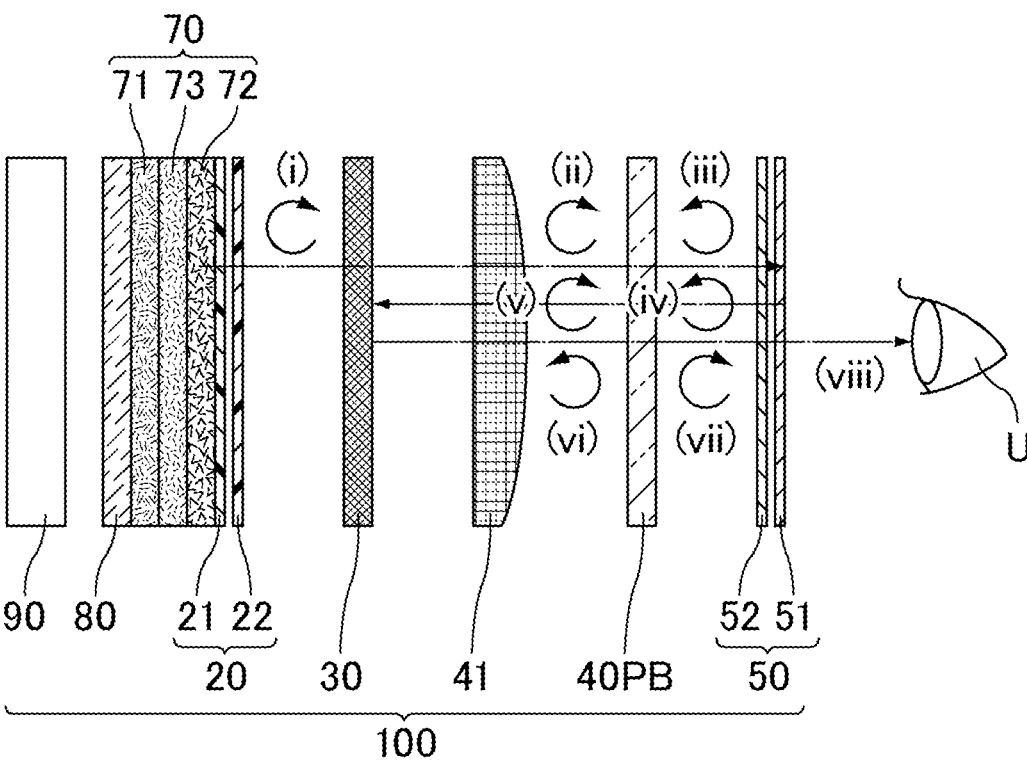
FIG. 15 is an exploded cross-sectional view schematically showing a display device of Embodiment 2.

FIG. 15 is an exploded cross-sectional view schematically showing a display device of Embodiment 2. As shown in FIG. 15, in a display device 100 of Embodiment 2, a display panel (liquid crystal panel) 70 includes a pair of substrates 71 and 72 and a liquid crystal layer 73 sandwiched between the substrates 71 and 72. The substrate 71 may be a TFT substrate 71. The substrate 72 may be a counter substrate 72.

The TFT substrate 71 may be, as shown in Embodiment 1, a TFT substrate including, on a supporting substrate, gate lines extending parallel to one another, source lines extending parallel to one another in a direction in which they intersect the gate lines via a gate insulator, and TFTs disposed at or near the respective intersections of the gate lines and the source lines.

The display mode of the liquid crystal panel is not limited. The liquid crystal panel may be in a horizontal alignment (transverse electric field) mode in which the counter electrode is disposed in the TFT substrate 71, or may be in a vertical alignment (vertical electric field) mode in which the counter electrode is disposed in the counter substrate 72 facing the TFT substrate 71 across the liquid crystal layer 73.

Figure 16:
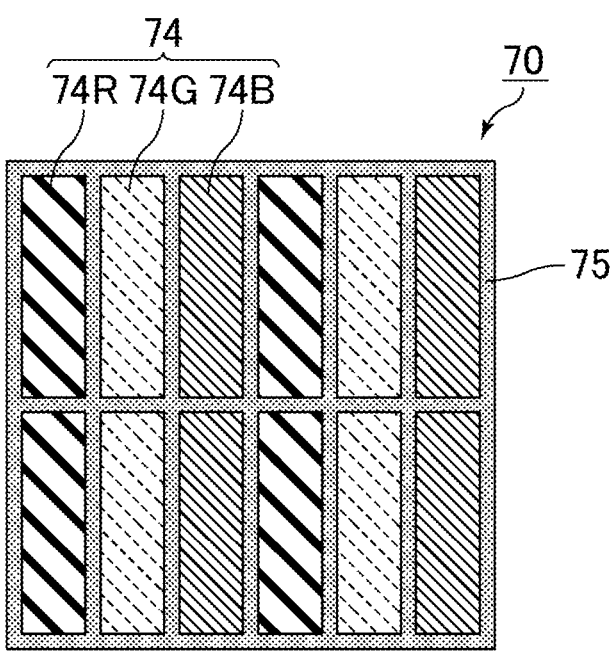
FIG. 16 is a schematic plan view of the liquid crystal panel shown in FIG. 15.

FIG. 16 is a schematic plan view of the liquid crystal panel shown in FIG. 15. The counter substrate 72 may be a color filter (CF) substrate including a supporting substrate and a black matrix and a CF layer which are formed on the supporting substrate.

As shown in FIG. 16, the CF substrate may have a configuration in which, for example, color filters 74 are arranged in the plane and partitioned by a black matrix 75. The color filters 74 may include red color filters 74R, green color filters 74G, and blue color filters 74B. The color filters 74 may be in a stripe arrangement where red, green, and blue color filters are repeated in the row direction and the color filters 74R, 74G, and 74B are arranged by color in the column directions. Pixels overlapping the red, green, and blue color filters 74R, 74G, and 74B respectively define red, blue, and green pixels.

The black matrix 75 can be one usually used in the field of liquid crystal panels and may be formed from a resin containing a black pigment, for example. The black matrix 75 may be in a grid pattern that overlaps the gate lines and/or source lines in a plan view.

The liquid crystal layer 73 includes liquid crystal molecules. In response to voltage applied between the common electrode and the pixel electrodes, an electric field is generated in the liquid crystal layer 73, and the alignment of the liquid crystal molecules varies according to the electric field, so that the amount of light transmitted can be controlled. The alignment azimuth of the liquid crystal molecules with no voltage applied is controlled by the controlling force of the alignment films. The state with no voltage applied means a state where no voltage is applied between the pair of electrodes (to the liquid crystal layer 73) or voltage lower than the threshold for the liquid crystal molecules is applied between the electrodes (to the liquid crystal layer 73).

The anisotropy of dielectric constant ($\Delta\varepsilon$) of the liquid crystal molecules defined by the following formula may be positive or negative.

$$\Delta\varepsilon=\text{(dielectric constant in long axis direction)}-\text{(dielectric constant in short axis direction)}$$

An alignment film may be disposed between the TFT substrate 71 and the liquid crystal layer 73 and an alignment film may be disposed between the counter substrate 72 and the liquid crystal layer 73. With no voltage applied to the liquid crystal layer 73, the alignment of liquid crystal molecules is controlled mainly by the force of the alignment films. For example, in a horizontal alignment mode, the tilt angle (pre-tilt angle) of liquid crystal molecules with no voltage applied may be from 0° to 5°, preferably from 0° to 3°, more preferably from 0° to 1°. The tilt angle of liquid crystal molecules means an angle at which the long axis direction (optic axis) of the liquid crystal molecules tilts toward the surface of the TFT substrate 71 or the surface of the counter substrate 72.

The second linearly polarizing plate 80 faces the circular polarizer 20 across the liquid crystal panel 70 (faces the viewer U across the liquid crystal panel 70). Preferably, the transmission axis of the first linearly polarizing plate 21 and the transmission axis of the second linearly polarizing plate 80 are disposed orthogonal to each other, i.e., in crossed Nicols. The second linearly polarizing plate 80 can be the same one as the first linearly polarizing plate 21.

The case of the normally black mode is described as an example. With no voltage applied, the alignment azimuth of liquid crystal molecules in a plan view is substantially parallel to the transmission axis of the first linearly polarizing plate 21 or the second linearly polarizing plate 80. Light incident on the back surface of the liquid crystal panel passes through the second linearly polarizing plate 80 to be linearly polarized light. The linearly polarized light passes through the liquid crystal layer 73 but does not pass through the first linearly polarizing plate 21, so that the liquid crystal panel provides black display. Meanwhile, when voltage is applied to the liquid crystal layer 73, the alignment azimuth of liquid crystal molecules changes from the initial alignment azimuth, whereby the long axis direction of the liquid crystal molecules forms an angle with the transmission axes of the first linearly polarizing plate 21 and the second linearly polarizing plate 80. Thus, light passes through the first linearly polarizing plate 21, so that the liquid crystal panel provides white display.

In Embodiment 2, linearly polarized light having passed through the first linearly polarizing plate 21 passes through the quarter-wave plate 22 to be circularly polarized light. When the circular polarizer is the cholesteric liquid crystal element described above, the display quality of the liquid crystal panel may deteriorate because light reflected by the cholesteric liquid crystal element becomes stray light, which is a factor of unclear video. Thus, in Embodiment 2 utilizing a liquid crystal panel as the display panel 10, preferably, the circular polarizer is a stack of the first linearly polarizing plate 21 and the quarter-wave plate 22.

(Backlight)

The display device 100 of Embodiment 2 may further include a backlight that includes a light source and faces the liquid crystal panel 70 across the second linearly polarizing plate 80.

The backlight may be a direct-lit backlight or an edge-lit backlight. The direct-lit backlight includes a light source disposed on or behind the back surface of the liquid crystal panel. The edge-lit backlight includes a light guide plate disposed on or behind the back surface of the liquid crystal panel and a light source disposed at the side edge of the light guide plate. The edge-lit backlight utilizes the light source to illuminate the side edge of the light guide plate and utilizes the light guide plate to emit light toward the liquid crystal panel. A reflective sheet may be disposed on or behind the back surface of the light guide plate, and a prism sheet or a diffusing sheet, for example, may be disposed between the light guide plate and the display device 100.

The backlight preferably causes light emitted from the light source to converge in the direction along the thickness of the liquid crystal panel. The backlight may have a full width at half maximum of from 15° to 30°. The full width at half maximum can be defined by measuring the luminance viewing angle characteristics by a method in conformity with IEC 61747-30 and determining the range of angle in which the luminance is equal to or more than half of the maximum luminance.

Embodiment 3

Figure 17:
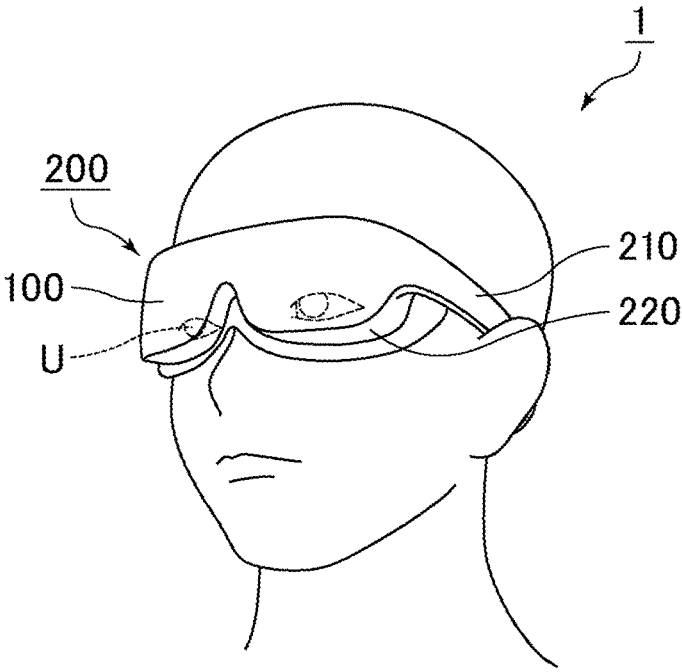
FIG. 17 is a schematic perspective view showing an example of the appearance of a head-mounted display of Embodiment 3.

In the present embodiment, features unique to the present embodiment are mainly described and description of the same features as in Embodiment 1 is omitted. FIG. 17 is a schematic perspective view showing an example of the appearance of a head-mounted display of Embodiment 3. As shown in FIG. 17, a head-mounted display 200 of the present embodiment includes a display device 100 and a wearable part 210 to be worn on the head of a viewer U. The head-mounted display 200 of the present embodiment may be an immersive HMD that surrounds the space in front of the eyes of the viewer U to shield the space from external light when worn on the head, or may be an eyeglass-type HMD.

The display device 100 has a function of displaying a video (images) to the viewer U. The display device 100 converts video display signals to a video.

When the head-mounted display 200 is an eyeglass-type HMD, as shown in FIG. 17, the portions corresponding to lenses of glasses may be defined by the display device 100, and the wearable part 210 may be the temples of glasses that sit on the ears of the viewer U.

When the head-mounted display 200 is an immersive HMD, the wearable part 210 may include a fitting band that surrounds the head when worn by the viewer U and fixes the head-mounted display 200 on the head of the viewer U.

The head-mounted display 200 may employ a one-display system using one display panel for both eyes, or a two-display system using one display panel for each eye. The immersive HMD described above is applicable to both the one-display system and the two-display system, for example. The eyeglass-type HMD is applicable to the two-display system, for example.

The head-mounted display 200 may further include a facial cushion 220 disposed between the display device 100 and the face of the viewer U. The facial cushion 220 is a cushioning material disposed between the display device 100 and the face of the viewer U. With the facial cushion 220, external light entering the field of view of the viewer U can be reduced while the head-mounted display 200 is used.

The head-mounted display 200 may further include a sound output unit that has a function of generating voice, music, sound effects, and other sounds.

The sound output unit converts sound output signals to sounds. Usually, products available as headphones can be used. The sound output unit, together with the wearable part 210, may function as a contact part that comes into contact with the ear when the head-mounted display 200 is worn on the head of the viewer U.

The head-mounted display 200 may include a driving unit that outputs video display signals and sound output signals. The driving unit is wired or wirelessly connected to the display device 100 and the sound output unit. The wireless communication system may be, for example, Bluetooth®.

EXAMPLE

The present invention is described below with reference to examples and comparative examples. The present invention is not limited to these examples.

Example 1 and Example 2

A display device 100 of Example 1 shown in FIG. 6 and a display device 100 of Example 2 shown in FIG. 7 were subjected to the following simulations. The display devices 100 of Example 1 and Example 2 specifically included, in the following order, a liquid crystal panel as a display panel 10, a circular polarizer 20 including a first linearly polarizing plate 21 and a first quarter-wave plate 22, a semi-transparent mirror 30, a lens 41, a PB lens 40PB, and a circularly polarized light-selective reflector 50.

The lens 41 of Example 1 was a lens optimized using a freeform surface. The lens 41 had shape with a radius of curvature that was about 85 mm in the vicinity of the center of the surface facing the display panel 10 and that gradually decreased toward the outer periphery. The radius of curvature of the surface of the lens 41 facing the viewer U was about 140 mm (convex relative to the viewer U) with a point of inflection at a position about 7 mm outward from the center, and the portion outside the point of inflection was concave relative to the viewer U.

The lens 41 of Example 2 was a lens optimized using a freeform surface. The lens 41 had shape with a radius of curvature that was about 70 mm in the vicinity of the center of the surface facing the display panel 10 and that gradually decreased toward the outer periphery. The radius of curvature of the surface of the lens 41 facing the viewer U was about 600 mm (convex relative to the viewer U) with a point of inflection at a position about 7 mm outward from the center, and the portion outside the point of inflection was concave relative to the viewer U.

Also, the display device 100 of Example 1 was a display device that caused light from the display panel 10 to diverge twice and converge once through the PB lens 40PB before being emitted toward the viewer U. The display device 100 of Example 2 was a display device that caused light from the display panel 10 to converge twice and diverge once through the PB lens 40PB before being emitted toward the viewer U.

Figure 18:
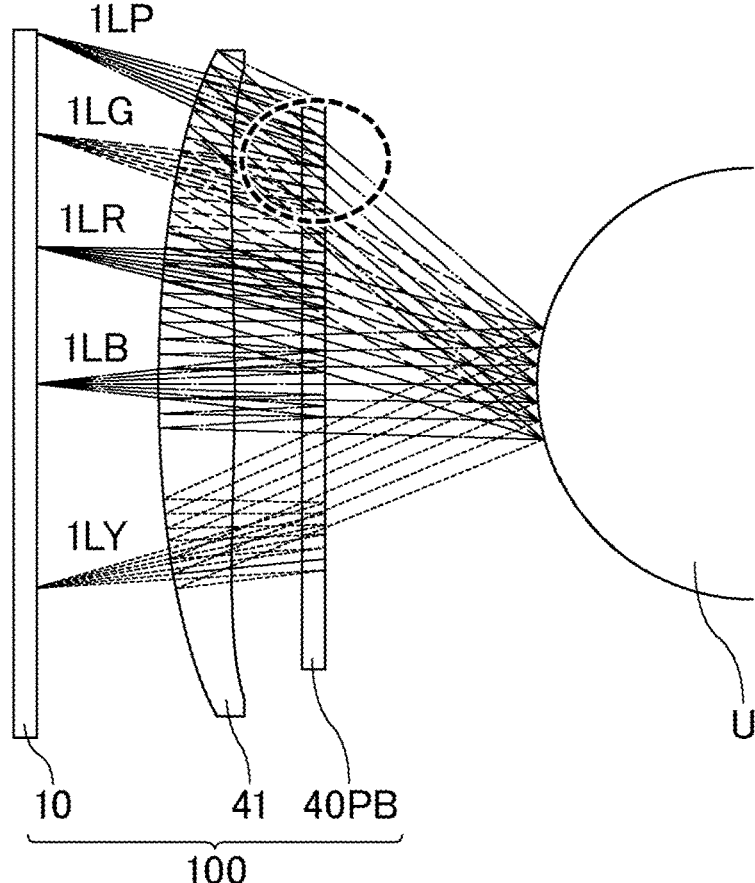
FIG. 18 shows the simulation results of optical paths in a display device of Example 1.
Figure 19:
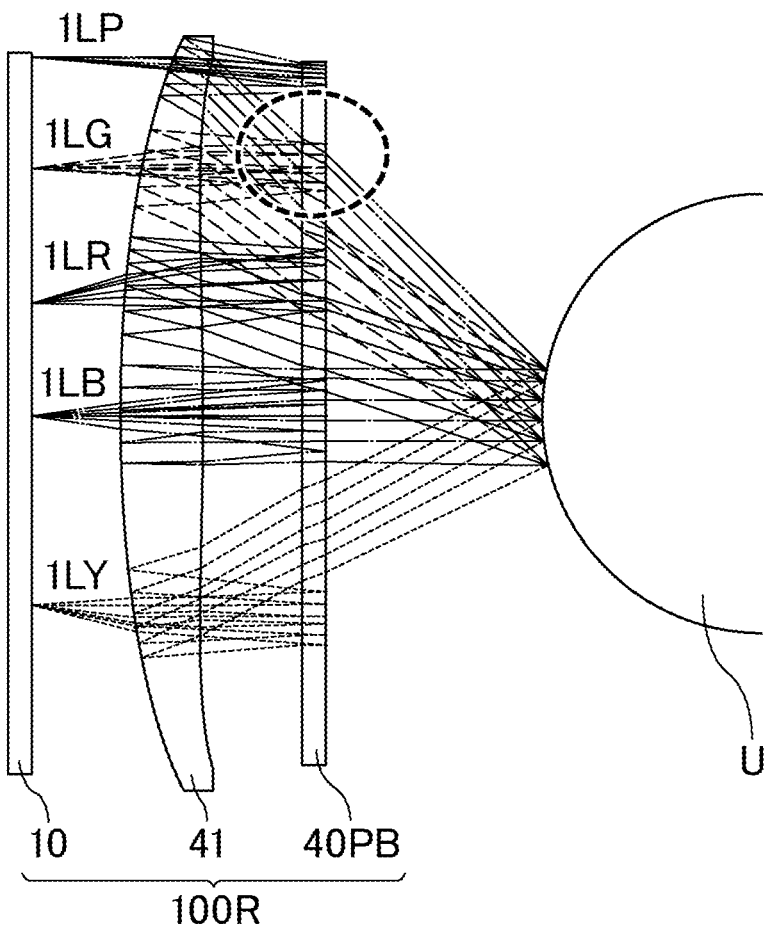
FIG. 19 shows the simulation results of optical paths in a display device of Example 2.

FIG. 18 shows the simulation results of optical paths in a display device of Example 1. FIG. 19 shows the simulation results of optical paths in a display device of Example 2. In FIG. 18 and FIG. 19, the circular polarizer 20, the semi-transparent mirror 30, and the circularly polarized light-selective reflector 50 are omitted. FIG. 18 and FIG. 19 show the simulation results showing how pink light 1LP, green light 1LG, red light 1LR, blue light 1LB, and yellow light 1LY from the display panel 10 each reached the viewer U through the first lens 41 and the PB lens 40PB. For the simulations herein, the panel was a 2.5-inch one (2160× 2160), the pixel size was about 20 μm, the refractive index of the lens material was 1.5 on the assumption of use of an acrylic resin, and the diameter of the lens was from 40 to 45 mm.

As shown in FIG. 18 and FIG. 19, in Example 1 and Example 2, although the same lens surface (the same region of a lens surface) is shared by a plurality of lights whose optical paths are folded different numbers of times, the flexibility of design increased owing to the different concave/convex structural effects of the PB lens in different directions of incidence. These results demonstrate that the optimal optical design can be achieved and thus the display characteristics can be enhanced.

In addition, as shown by the dashed-line circles in FIG. 18 and FIG. 19, Example 1 was lower than Example 2 in share ratio of the lens surface of the PB lens 40PB between the pink light 1LP whose optical path was folded once through the PB lens 40PB and entered the PB lens 40PB for the second time and the green light 1LG incident on the PB lens 40PB for the first time. With such a low share ratio, the lens shape tends to be easy to optimize for individual rays. These results show that Example 1 enables a more optimal optical design and more enhances the display characteristics than Example 2.

An index of optical design optimization often used for lens optics is the spot diagram. This diagram shows how wide the light from a single point on a display device appears to the eyes. Specifically, a simulation was performed that demonstrated the paths of lights (video lights) output from one point on the display device at equal intervals, and the positions where the lights appear to the eyes of the viewer U. Then, the positional shifts of these lights output at equal intervals were evaluated using root mean square (RMS).

Liquid crystal display devices currently becoming the mainstream have a resolution of 1200 ppi. The size of each pixel is about 21 μm in such devices, so that the ideal RMS value is 21 μm or less. The resolving power of the human eye, however, decreases especially in a region with a wide angle of incidence (angle of incidence of roughly 20 degrees or wider), from which a presumption can be drawn that an RMS value of 5 pixels or less is acceptable.

Figure 20:
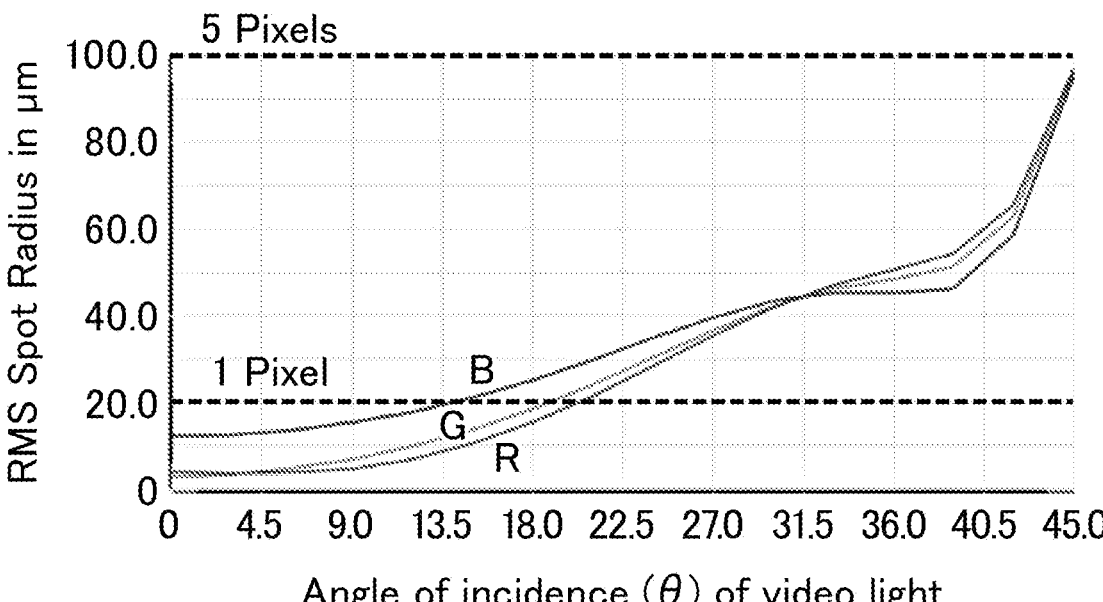
FIG. 20 shows the simulation results from a spot diagram obtained in the front view of the display device of Example 1.
Figure 21:
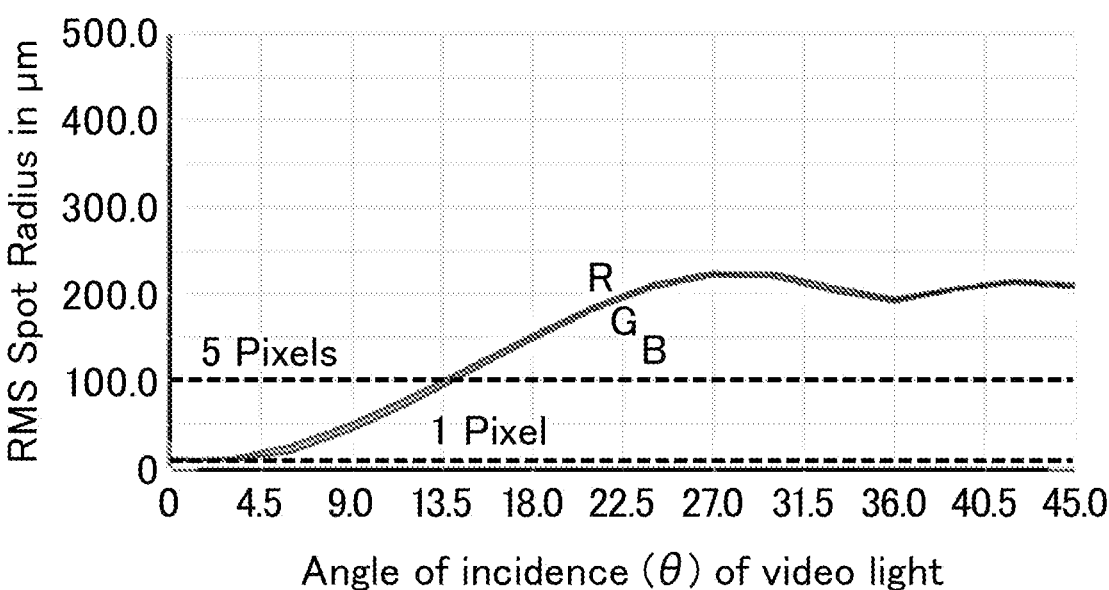
FIG. 21 shows the simulation results from a spot diagram obtained in the front view of the display device of Example 2.

FIG. 20 shows the simulation results from a spot diagram obtained in the front view of the display device of Example 1. FIG. 21 shows the simulation results from a spot diagram obtained in the front view of the display device of Example 2. The "front view" means a view in a state where the eyes are directed to the front. As shown in FIG. 20, in Example 1, the RMS value was successfully kept below 5 pixels up to an angle of incidence of video light of about 45°. Also, as shown in FIG. 21, in Example 2, the RMS value was successfully kept below 5 pixels up to an angle of incidence of video light of about 13.5°. These results also show that Example 1 more enhances the display characteristics than Example 2.

Example 3 and Comparative Example 1

The following simulation was performed on the display device of Example 3 obtained by widening the FOV of the display device of Example 1 to an FOV of 105° and on the display device of Comparative Example 1 obtained by changing the PB lens 40PB of the display device of Example 1 to a Fresnel lens as the second lens 42 and widening the FOV to a FOV of 105°. Widening the FOV means enabling provision of a video with a deeper sense of immersion with a wider viewing angle. Widening the FOV from 90° to 105° significantly increases the design difficulty. This is because a larger lens size is required to widen the FOV to 105° and thus the design needs to be adjusted for a wider field of view while the flexibility of the design decreases due to the increased thickness of the lens and other factors.

Figure 22:
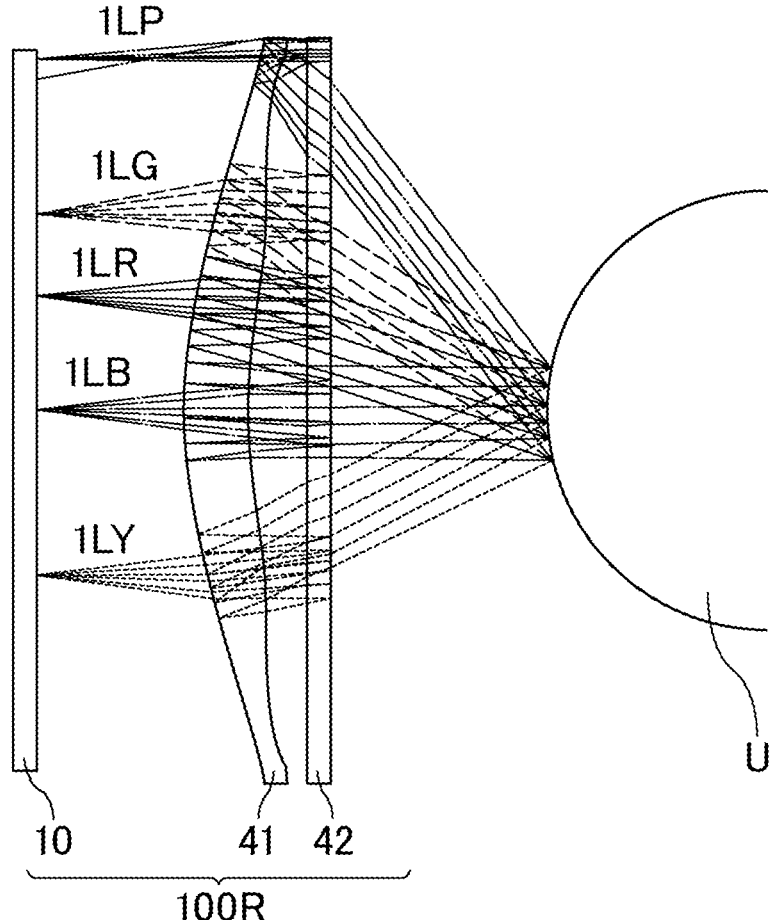
FIG. 22 shows the simulation results of optical paths in a display device of Comparative Example 1.
Figure 23:
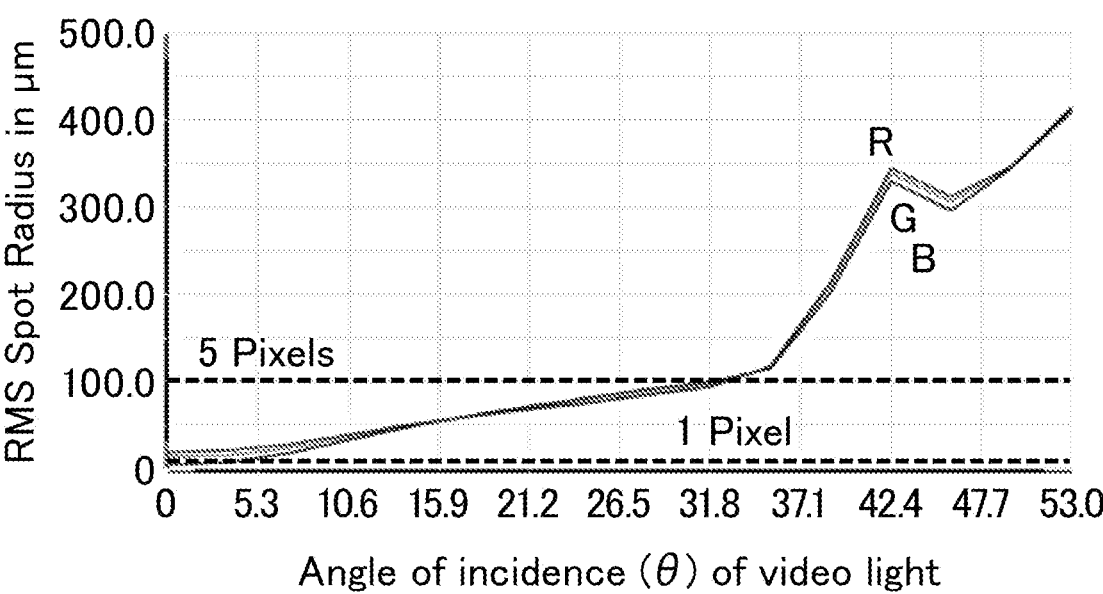
FIG. 23 shows the simulation results from a spot diagram of the display device of Comparative Example 1.
Figure 24:
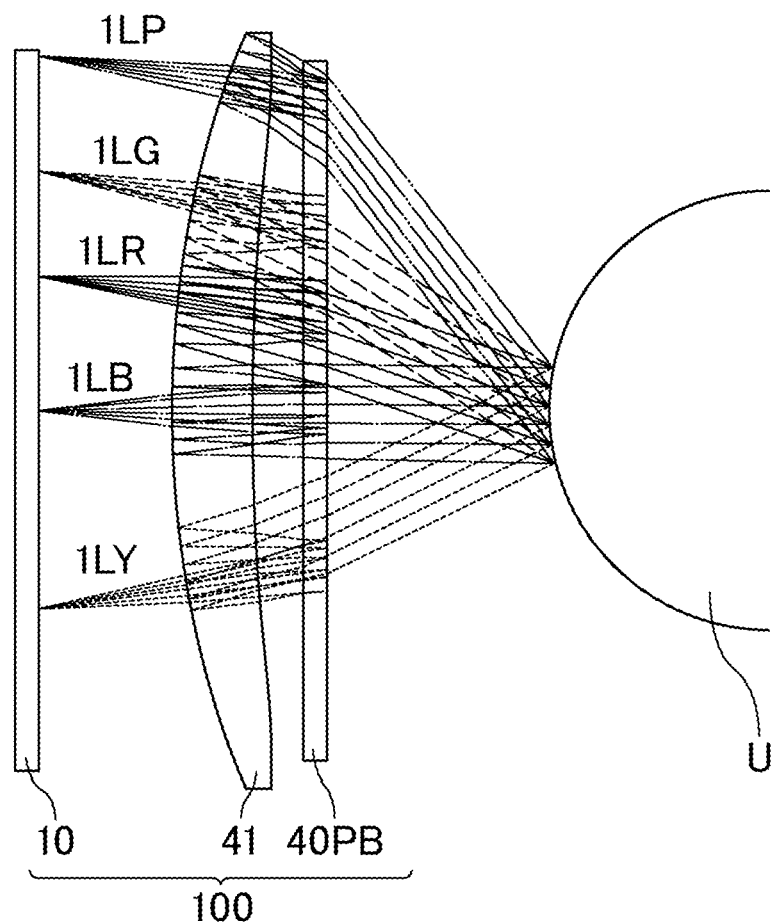
FIG. 24 shows the simulation results of optical paths in a display device of Example 3.
Figure 25:
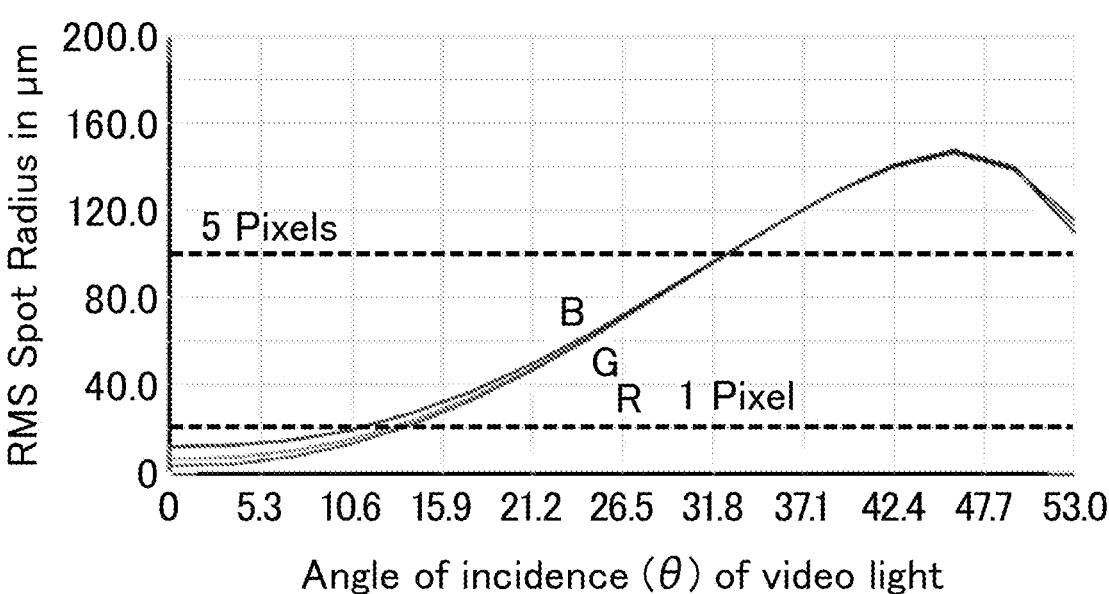
FIG. 25 shows the simulation results from a spot diagram of the display device of Example 3.
Figure 26:
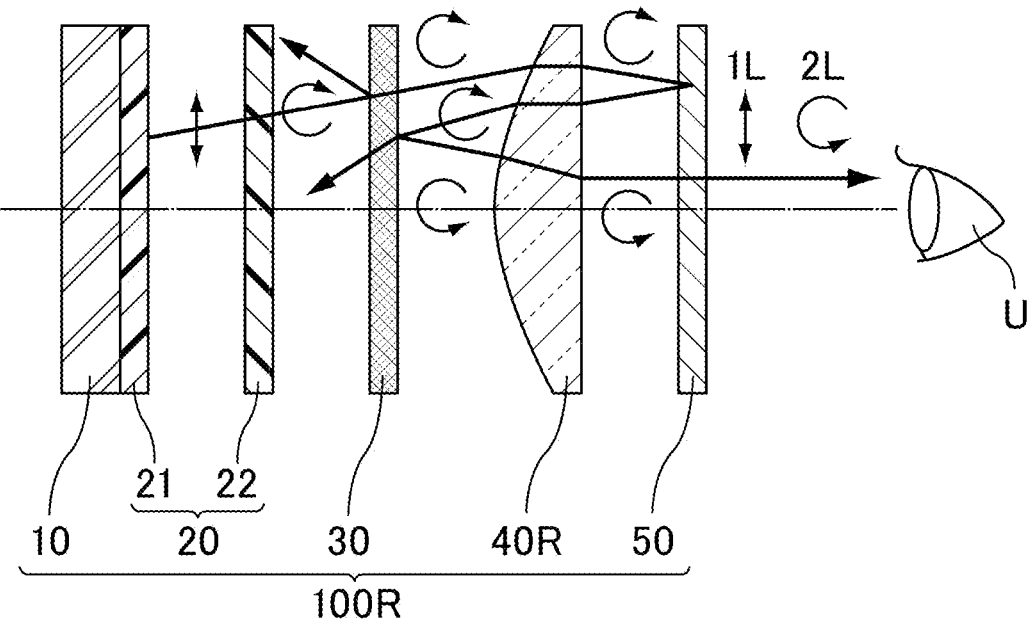
FIG. 26 is an exploded cross-sectional view schematically showing a display device of a comparative embodiment.

FIG. 22 shows the simulation results of optical paths in a display device of Comparative Example 1. FIG. 23 shows the simulation results from a spot diagram of the display device of Comparative Example 1. FIG. 24 shows the simulation results of optical paths in a display device of Example 3. FIG. 25 shows the simulation results from a spot diagram of the display device of Example 3.

In FIG. 22 and FIG. 24, the circular polarizer 20, the semi-transparent mirror 30, and the circularly polarized light-selective reflector 50 are omitted. FIG. 22 shows the simulation results of how each of the pink light 1LP, the green light 1LG, the red light 1LR, the blue light 1LB, and the yellow light 1LY from the display panel 10 reaches the viewer U through the first lens 41 and the second lens 42. FIG. 24 shows the simulation result of how each of the pink light 1LP, the green light 1LG, the red light 1LR, the blue light 1LB, and the yellow light 1LY from the display panel 10 reaches the viewer U through the first lens 41 and the PB lens 40PB.

The optimization simulations under the same conditions as in Example 1 demonstrate that, as shown in FIG. 22, FIG. 23, FIG. 24, and FIG. 25, Examples 3 achieved better display characteristics with less image blurriness even with a wide angle of incidence and thus had a higher achievability of a wide FOV optical system than Comparative Example 1.

REFERENCE SIGNS LIST

1L: linearly polarized light
1LB, 1LG, 1LP, 1LR, 1LY: light
2L: circularly polarized light
10: display panel (self-luminous panel)
20: circular polarizer
21, 51: linearly polarizing plate
22, 52: quarter-wave plate 30: semi-transparent mirror
40R, 41, 42: lens
40PB, 41PB, 42PB: Pancharatnam-Berry lens (PB lens)
50: circularly polarized light-selective reflector
70: display panel (liquid crystal panel)
71: substrate (TFT substrate)
72: substrate (counter substrate)
73: liquid crystal layer
74: color filter
75: black matrix
74B: blue color filter
74G: green color filter
74R: red color filter
80: second linearly polarizing plate
100, 100R: display device
200: head-mounted display
210: wearable part
220: facial cushion
410: supporting substrate
420: liquid crystal molecule
420A: optically anisotropic layer
420X: long axis
LC0, LC1, LC2: left-handed circularly polarized light
R0, R1, R2: region
U: viewer

What is claimed is:

1. A display device comprising, in the following order toward a viewer:
a display panel;
a semi-transparent mirror;
a lens;
a Pancharatnam-Berry lens configured to cause one-handed circularly polarized light incident thereon, that is left-handed circularly polarized light or right-handed circularly polarized light, to converge, while causing opposite-handed circularly polarized light incident thereon to diverge; and
a circularly polarized light-selective reflector.

2. The display device according to claim 1, wherein light emitted from the display panel diverges twice and converges once through the Pancharatnam-Berry lens before being emitted toward the viewer.

3. The display device according to claim 1, wherein the Pancharatnam-Berry lens includes a supporting substrate and liquid crystal molecules on the supporting substrate,
in a plan view of the Pancharatnam-Berry lens, as viewed by the viewer, a long axis of the liquid crystal molecules rotates counterclockwise from a center to an outside of the Pancharatnam-Berry lens, and
right-handed circularly polarized light emitted from the display panel is incident on the Pancharatnam-Berry lens.

4. The display device according to claim 1,
wherein the Pancharatnam-Berry lens includes a supporting substrate and liquid crystal molecules on the supporting substrate,
in a plan view of a surface of the Pancharatnam-Berry lens, as viewed by the viewer, a long axis of the liquid crystal molecules rotates clockwise from a center to an outside of the Pancharatnam-Berry lens, and
left-handed circularly polarized light emitted from the display panel is incident on the Pancharatnam-Berry lens.

5. The display device according to claim 1,
wherein the lens is a first lens, and
the display device further comprises a second lens disposed closer to the viewer than the display panel.

6. The display device according to claim 5,
wherein the second lens is disposed between the Pancharatnam-Berry lens and the circularly polarized light-selective reflector.

7. The display device according to claim 5,
wherein the second lens is disposed closer to the viewer than the circularly polarized light-selective reflector.

8. A head-mounted display comprising:
the display device according to claim 1, and
a wearable part to be worn on a head of the viewer.

9. A display device comprising, in the following order toward a viewer:
a display panel;
a semi-transparent mirror;
a first Pancharatnam-Berry lens configured to cause one-handed circularly polarized light incident thereon, that is left-handed circularly polarized light or right-handed circularly polarized light, to converge, while causing opposite-handed circularly polarized light incident thereon to diverge;
a circularly polarized light-selective reflector; and
a second Pancharatnam-Berry lens disposed between the semi-transparent mirror and the circularly polarized light-selective reflector, and configured to cause one-handed circularly polarized light incident thereon, that is left-handed circularly polarized light or right-handed circularly polarized light, to converge, while causing opposite-handed circularly polarized light incident thereon to diverge.

10. The display device according to claim 9, further comprising, between the semi-transparent mirror and the circularly polarized light-selective reflector, a third Pancharatnam-Berry lens configured to cause one-handed circularly polarized light incident thereon, that is left-handed circularly polarized light or right-handed circularly polarized light, to converge, while causing opposite-handed circularly polarized light incident thereon to diverge.

* * * * *